(12) United States Patent
Matsubara et al.

(10) Patent No.: US 12,052,515 B2
(45) Date of Patent: Jul. 30, 2024

(54) TRANSMITTING APPARATUS, RECEIVING APPARATUS, AND TRANSMISSION SYSTEM

(71) Applicant: Sony Semiconductor Solutions Corporation, Kanagawa (JP)

(72) Inventors: Yoshiaki Matsubara, Kanagawa (JP); Hideyuki Someya, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 314 days.

(21) Appl. No.: 17/611,465

(22) PCT Filed: May 19, 2020

(86) PCT No.: PCT/JP2020/019707
§ 371 (c)(1),
(2) Date: Nov. 15, 2021

(87) PCT Pub. No.: WO2020/261813
PCT Pub. Date: Dec. 30, 2020

(65) Prior Publication Data
US 2022/0217310 A1    Jul. 7, 2022

(30) Foreign Application Priority Data
Jun. 28, 2019   (JP) ................................. 2019-121340

(51) Int. Cl.
*H04N 23/84* (2023.01)
*G06T 7/11* (2017.01)
*G06T 7/90* (2017.01)
*H04N 23/60* (2023.01)

(52) U.S. Cl.
CPC ............ *H04N 23/843* (2023.01); *G06T 7/11* (2017.01); *G06T 7/90* (2017.01); *H04N 23/665* (2023.01); *G06T 2207/10024* (2013.01)

(58) Field of Classification Search
CPC ...... H04N 23/843; H04N 23/665; G06T 7/11; G06T 7/90; G06T 2207/10024
USPC ...................................................... 348/222.1
See application file for complete search history.

(56) References Cited

U.S. PATENT DOCUMENTS

2016/0171651 A1    6/2016  Lee
2020/0333993 A1*  10/2020  Yoshimochi ........... H04N 23/60

FOREIGN PATENT DOCUMENTS

| JP | 2010-147531 A | 7/2010 |
|----|---------------|--------|
| JP | 2012-209831 A | 10/2012 |
| JP | 2013-164834 A | 8/2013 |
| JP | 2014-039219 A | 2/2014 |
| JP | 2015-231103 A | 12/2015 |

(Continued)

OTHER PUBLICATIONS

International Search Report (PCT/ISA/210), International Application No. PCT/JP2020/019707, dated Jul. 2, 2020.

*Primary Examiner* — Joel W Fosselman
(74) *Attorney, Agent, or Firm* — Michael Best & Friedrich LLP

(57) ABSTRACT

It is an object to realize a demosaicing process for a partial region of interest (ROI) segmented from a captured image. A transmitting apparatus includes a controlling section that controls acquisition of demosaicing information for use in a demosaicing process for demosaicing image data of a ROI and a transmitting section that sends out the image data of the ROI as payload data and sends out ROI information as embedded data.

11 Claims, 22 Drawing Sheets

(56) References Cited

FOREIGN PATENT DOCUMENTS

| JP | 2016-201756 A | 12/2016 |
|----|---------------|---------|
| JP | 2019-091967 A | 6/2019 |
| TW | 201924324 A | 6/2019 |
| WO | 2012/157178 A1 | 11/2012 |

\* cited by examiner

FIG. 14A

ARRAY EXAMPLE A

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

| R | G | R |
|---|---|---|
| G | B | G |
| R | G | R |

(H, V) = (ODD NUMBER, ODD NUMBER)

| G | R | G |
|---|---|---|
| B | G | B |
| G | R | G |

← PA2

(H, V) = (EVEN NUMBER, ODD NUMBER)

PA3 →

| G | B | G |
|---|---|---|
| R | G | R |
| G | B | G |

(H, V) = (ODD NUMBER, EVEN NUMBER)

| B | G | B |
|---|---|---|
| G | R | G |
| B | G | B |

← PA4

(H, V) = (EVEN NUMBER, EVEN NUMBER)

FIG.15A

ARRAY EXAMPLE B

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

| G | R | G |
|---|---|---|
| B | G | B |
| G | R | G |

(H, V) = (ODD NUMBER, ODD NUMBER)

| R | G | R |
|---|---|---|
| G | B | G |
| R | G | R |

← PB2

(H, V) = (EVEN NUMBER, ODD NUMBER)

PB3 →

| B | G | B |
|---|---|---|
| G | R | G |
| B | G | B |

(H, V) = (ODD NUMBER, EVEN NUMBER)

| G | B | G |
|---|---|---|
| R | G | R |
| G | B | G |

← PB4

(H, V) = (EVEN NUMBER, EVEN NUMBER)

FIG. 16A

ARRAY EXAMPLE C

| B | G | B | G | B | G | B | G |
|---|---|---|---|---|---|---|---|
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |

| B | G | B |
|---|---|---|
| G | R | G |
| B | G | B |

(H, V) = (ODD NUMBER, ODD NUMBER)

| G | B | G |
|---|---|---|
| R | G | R |
| G | B | G |

← PC2

(H, V) = (EVEN NUMBER, ODD NUMBER)

PC3 →

| G | R | G |
|---|---|---|
| B | G | B |
| G | R | G |

(H, V) = (ODD NUMBER, EVEN NUMBER)

| R | G | R |
|---|---|---|
| G | B | G |
| R | G | R |

← PC4

(H, V) = (EVEN NUMBER, EVEN NUMBER)

FIG.17A

ARRAY EXAMPLE D

| R | G | R | G | R | G | R | G |
|---|---|---|---|---|---|---|---|
| W | B | W | B | W | B | W | B |
| R | G | R | G | R | G | R | G |
| W | B | W | B | W | B | W | B |
| R | G | R | G | R | G | R | G |
| W | B | W | B | W | B | W | B |
| R | G | R | G | R | G | R | G |
| W | B | W | B | W | B | W | B |

| R | G | R |
|---|---|---|
| W | B | W |
| R | G | R |

(H, V) = (ODD NUMBER, ODD NUMBER)

| G | R | G |
|---|---|---|
| B | W | B |
| G | R | G |

← PD2

(H, V) = (EVEN NUMBER, ODD NUMBER)

PD3 →

| W | B | W |
|---|---|---|
| R | G | R |
| W | B | W |

(H, V) = (ODD NUMBER, EVEN NUMBER)

| B | W | B |
|---|---|---|
| G | R | G |
| B | W | B |

← PD4

(H, V) = (EVEN NUMBER, EVEN NUMBER)

TRANSMITTING APPARATUS, RECEIVING APPARATUS, AND TRANSMISSION SYSTEM

TECHNICAL FIELD

The present disclosure relates to a transmitting apparatus, a receiving apparatus, and a transmission system.

BACKGROUND ART

In recent years, there have been growing applications in which large amounts of data are transmitted in bulk. Such applications tend to pose large loads on the transmission system, possibly causing the transmission system to go down in worst-case scenarios and fail to perform data transmission.

To avoid transmission system shutdowns, it has been known in the art to specify an object as an imaging target and transmit only a partial image of the specified object that has been segmented, rather than transmitting an entire captured image (see, for example, PTL 1 through PTL 4).

CITATION LIST

Patent Literature

[PTL 1]
  Japanese Patent Laid-open No. 2016-201756
[PTL 2]
  Japanese Patent Laid-open No. 2014-39219
[PTL 3]
  Japanese Patent Laid-open No. 2013-164834
[PTL 4]
  Japanese Patent Laid-open No. 2012-209831

SUMMARY

Technical Problem

However, nothing has been examined about a demosaicing process in a case where a partial region of interest (ROI) segmented from a captured image is transmitted.

It is an object of the present disclosure to realize a demosaicing process for a partial region of interest (ROI) segmented from a captured image.

Solution to Problem

A transmitting apparatus according to an aspect of the present disclosure includes a controlling section that controls acquisition of demosaicing information for use in a demosaicing process for demosaicing image data of a ROI (Region Of Interest), and a transmitting section that sends out the image data of the ROI as payload data and sends out ROI information as embedded data.

A receiving apparatus according to an aspect of the present disclosure includes a receiving section that receives a transmission signal including image data of a ROI (Region Of Interest) in payload data and including ROI information in embedded data, a controlling section that controls extraction of demosaicing information for use in a demosaicing process for demosaicing the image data of the ROI from the transmission signal received by the receiving section, and a processing section that performs the demosaicing process for demosaicing the image data of the ROI using the demosaicing information extracted by the controlling section.

A transmission system according to an aspect of the present disclosure includes a transmitting apparatus having a controlling section that acquires demosaicing information for use in a demosaicing process for demosaicing image data of a ROI (Region Of Interest) and a transmitting section that sends out the image data as payload data and sends out ROI information as embedded data, and a receiving apparatus having a receiving section that receives a transmission signal including the image data of the ROI in the payload data and including the ROI information in the embedded data, a controlling section that controls extraction of demosaicing information for use in a demosaicing process for demosaicing the image data of the ROI from the transmission signal received by the receiving section, and a processing section that performs the demosaicing process for demosaicing the image data of the ROI using the demosaicing information extracted by the controlling section.

BRIEF DESCRIPTION OF DRAWINGS

FIG. 14A is a diagram schematically illustrating an array example A of a color array of image capturing elements disposed in an image capturing region of an image capturing section.

FIG. 14B is a diagram illustrating array patterns of color arrays of image capturing elements segmented from the image capturing region illustrated in FIG. 14A.

FIG. 15A is a diagram schematically illustrating an array example B of a color array of image capturing elements disposed in an image capturing region of an image capturing section.

FIG. 15B is a diagram illustrating array patterns of color arrays of image capturing elements segmented from the image capturing region illustrated in FIG. 15A.

FIG. 16A is a diagram schematically illustrating an array example C of a color array of image capturing elements disposed in an image capturing region of an image capturing section.

FIG. 16B is a diagram illustrating array patterns of color arrays of image capturing elements segmented from the image capturing region illustrated in FIG. 16A.

FIG. 17A is a diagram schematically illustrating an array example D of a color array of image capturing elements disposed in an image capturing region of an image capturing section.

FIG. 17B is a diagram illustrating array patterns of color arrays of image capturing elements segmented from the image capturing region illustrated in FIG. 17A.

DESCRIPTION OF EMBODIMENTS

Modes for carrying out the present disclosure will be described in detail hereinbelow with reference to the drawings. The description given below applies to specific examples of the present disclosure, and the present disclosure is not limited to the aspects illustrated below.

The modes for carrying out the technology according to the present disclosure (hereinafter referred to as "embodiments") will be described hereinbelow in the following order:

1. Technology 1 that is presupposed for the present disclosure (technology for transmitting a partial region (rectangular in shape) of interest (ROI) segmented from a captured image)
2. Technology 2 that is presupposed for the present disclosure (technology for transmitting a partial region (non-rectangular in shape) of interest (ROI) segmented from a captured image)
3. Principles of a demosaicing process in embodiments of the present disclosure
4. A transmitting apparatus, a receiving apparatus, and a transmission system according to a first embodiment of the present disclosure
5. A transmitting apparatus, a receiving apparatus, and a transmission system according to a modification of the first embodiment
6. A transmitting apparatus, a receiving apparatus, and a transmission system according to a second embodiment of the present disclosure

1. Technology 1 that is Presupposed for the Present Disclosure

[Configuration]

In recent years, portable devices such as smartphones and camera devices have been handling progressively larger quantities of image data, and are required to speed up and consume less electric power for data transmission within themselves or between different devices. In order to meet such requirements, standardization is under way for high-speed interface standards such as C-PHY standards and D-PHY standards established by MIPI Alliance as connection interfaces for potable deices and camera devices. The C-PHY standards and D-PHY standards are interface standards for physical layers (PHY) of communication protocols. In addition, DSI for the displays of portable devices and CSI for camera devices are present as higher protocol layers than the C-PHY standards and D-PHY standards.

Figure 1:
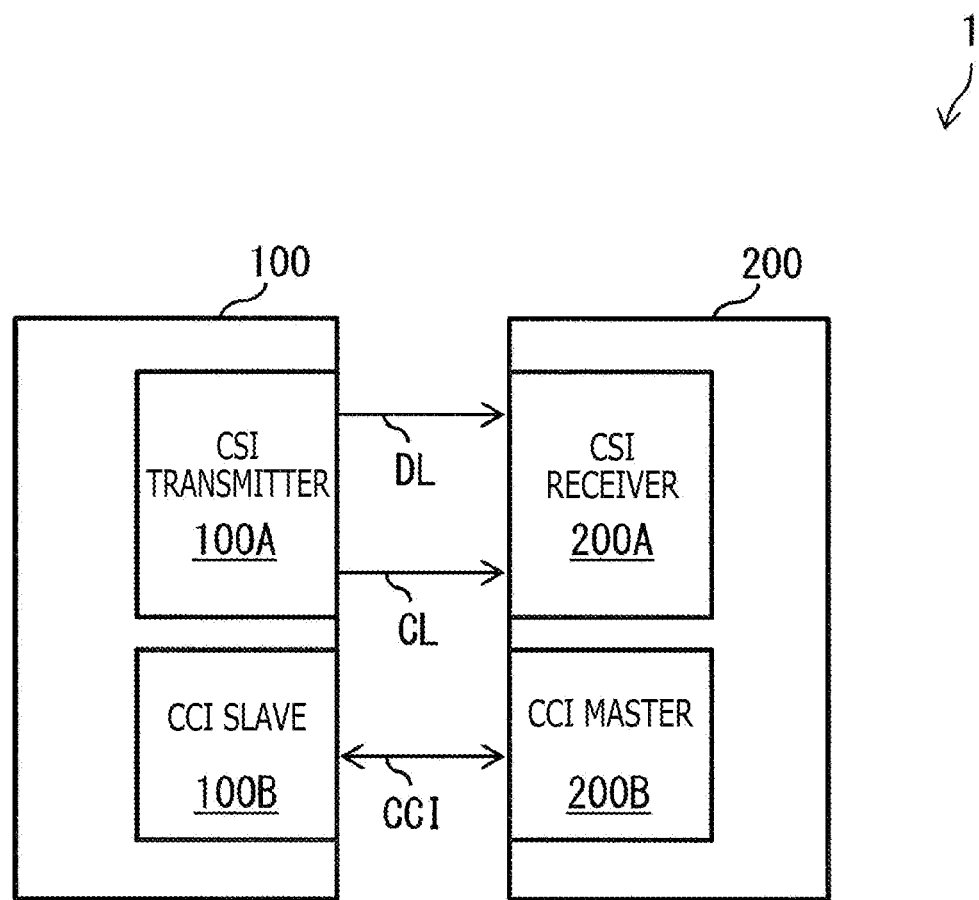
FIG. 1 is a diagram illustrating a general configurational example of a video transmission system.

A video transmission system 1 according to the technology that is presupposed for the present disclosure includes a system for transmitting and receiving signals according to various standards, and can transmit and receive signals according to the MIPI CSI-2 standards, the MIPI CSI-3 standards, or the MIPI DSI standards, for example. FIG. 1 illustrates a general configuration of the video transmission system 1 according to the technology that is presupposed for the present disclosure. The video transmission system 1 is applied to the transmission of data signals, clock signals, and control signals, and includes a video transmitting apparatus 100 and a video receiving apparatus 200. The video transmission system 1 includes a data lane DL for transmitting data signals representing image data etc., a clock lane CL for transmitting clock signals, and a camera control interface CCI for transmitting control signals, for example, between the video transmitting apparatus 100 and the video receiving apparatus 200. Though FIG. 1 illustrates an example in which one data lane DL is provided, a plurality of data lanes DL may be provided. The camera control interface CCI includes a bidirectional control interface compatible with the I$^2$C (Inter-Integrated Circuit) standards.

The video transmitting apparatus 100 includes an apparatus for sending out signals according to the MIPI CSI-2 standards, the MIPI CSI-3 standards, or the MIPI DSI standards. The video transmitting apparatus 100 has a CSI transmitter 100A and a CCI slave 100B. The video receiving apparatus 200 has a CSI receiver 200A and a CCI master 200B. In the clock lane CL, the CSI transmitter 100A and the CSI receiver 200A are connected to each other by a clock signal line. In the data lane DL, the CSI transmitter 100A and the CSI receiver 200A are connected to each other by a clock signal line. In the camera control interface CCI, the CCI slave 100B and the CCI master 200B are connected to each other by a control signal line.

The CSI transmitter 100A includes a differential signal transmitting circuit for generating a differential clock signal as a clock signal and outputting the generated differential clock signal to the clock signal line, for example. The CSI transmitter 100A may not necessarily transmit a differential signal, but may transmit a single-ended or three-phase signal. The CSI transmitter 100A also includes a differential signal transmitting circuit for generating a differential data signal as a data signal and outputting the generated differential data signal to the data signal line, for example. The CSI receiver 200A includes a differential signal receiving circuit for receiving a differential clock signal as a clock signal and performing a predetermined processing process on the received differential clock signal. The CSI receiver 200A also includes a differential signal receiving circuit for receiving a differential data signal as a data signal and performing a predetermined processing process on the received differential data signal.

(Video Transmitting Apparatus 100)

Figure 2:
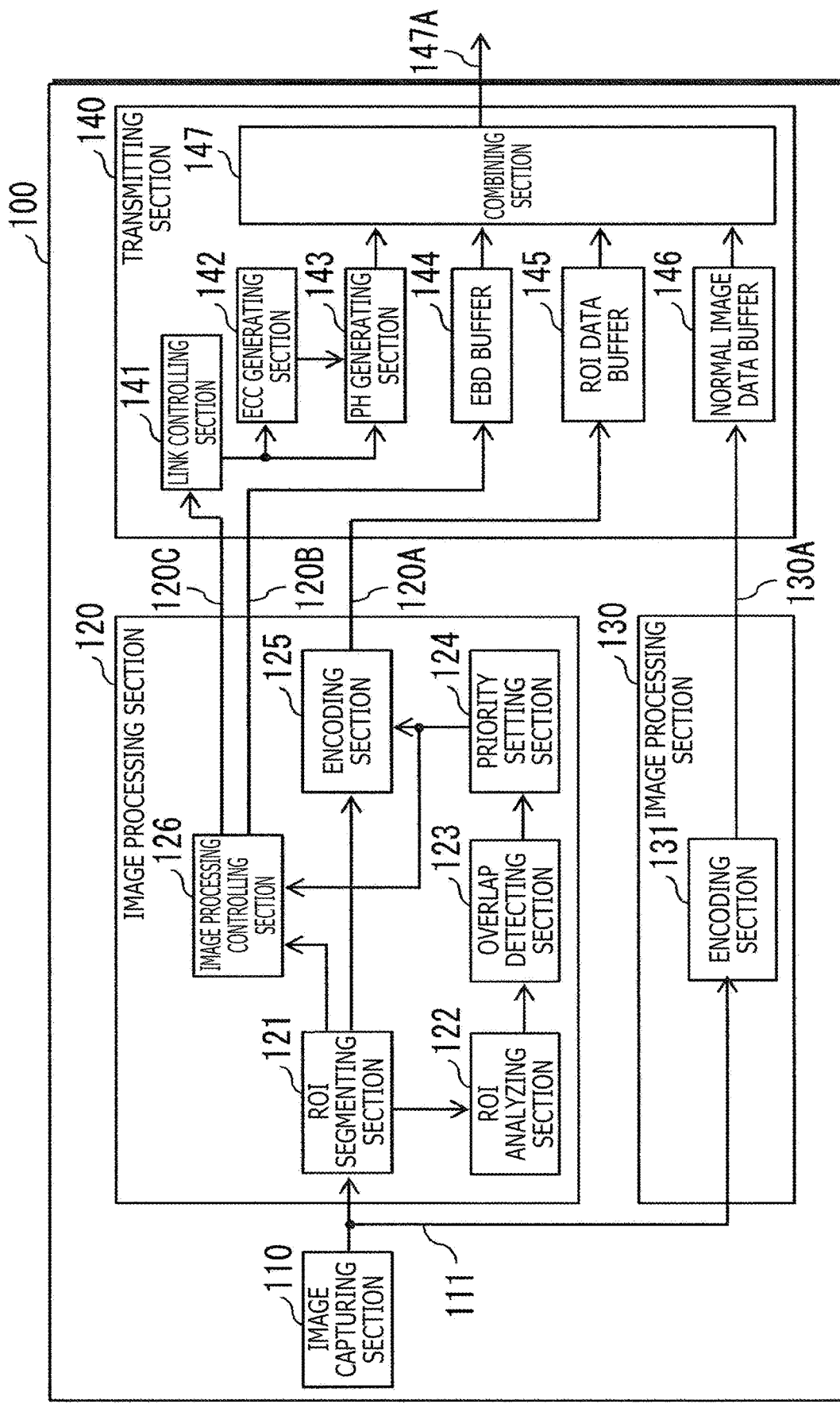
FIG. 2 is a diagram illustrating a general configurational example of a video transmitting apparatus illustrated in FIG. 1.
Figure 3:
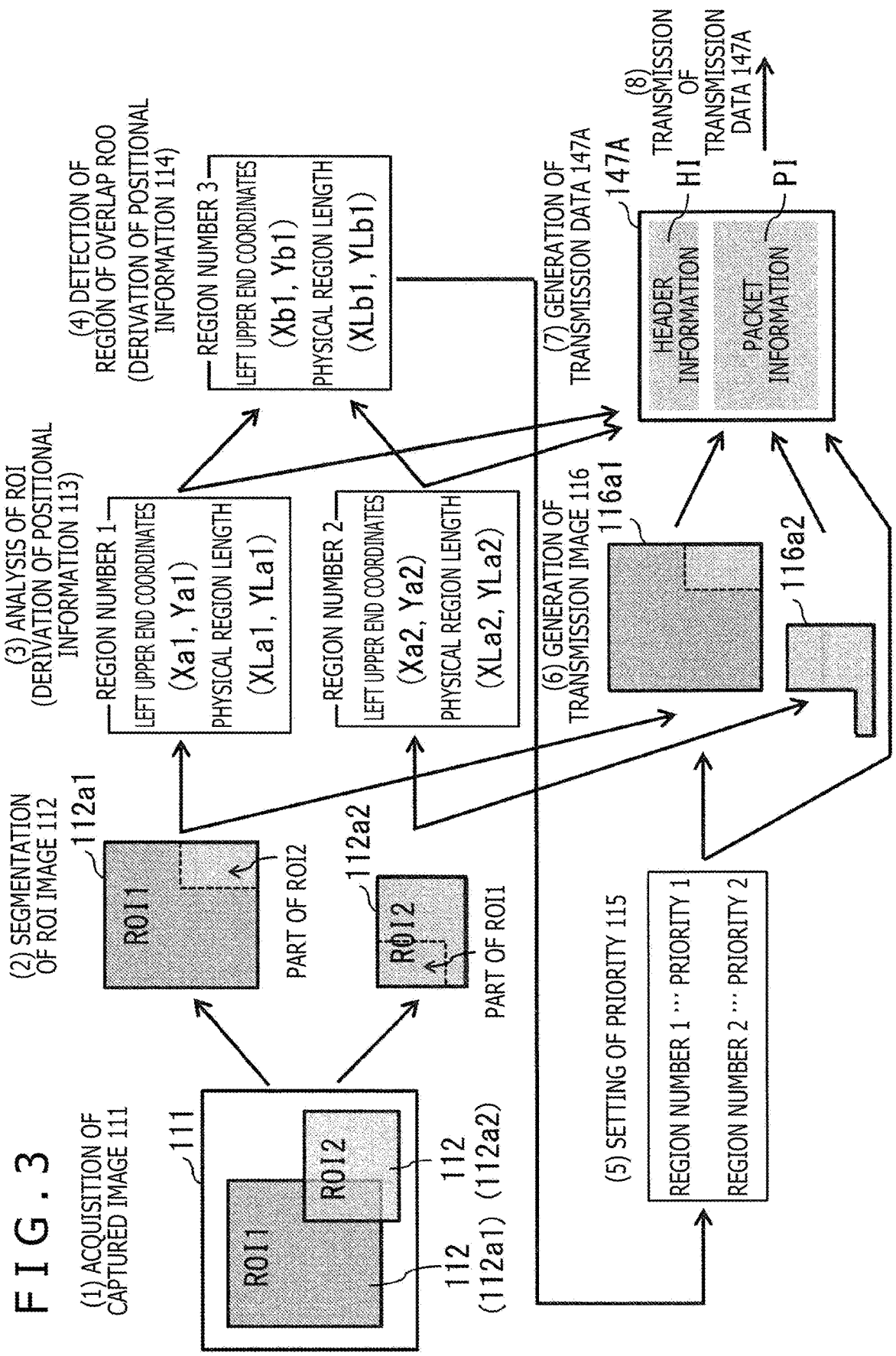
FIG. 3 is a diagram illustrating an example of a procedure for generating transmission data when two ROIs are included in a captured image.

FIG. 2 illustrates a configurational example of the video transmitting apparatus 100. The video transmitting apparatus 100 corresponds to a specific example of the CSI transmitter 100A. The video transmitting apparatus 100 includes an image capturing section 110, image processing sections 120 and 130, and a transmitting section 140, for example. The video transmitting apparatus 100 transmits transmission data 147A generated by performing a predetermined processing process on a captured image 111 obtained by the image capturing section 110 through the data line DL to the video receiving apparatus 200. FIG. 3 illustrates an example of a procedure for generating the transmission data 147A.

The image capturing section 110 converts an optical image obtained through an optical lens into image data, for example. The image capturing section 110 includes a CCD (Charge Coupled Device) image sensor or a CMOS (Complementary Metal Oxide Semiconductor) image sensor. The image capturing section 110 has an analog-to-digital converting circuit that converts analog image data into digital image data. The converted image data may be of a YCbCr data format that represents the colors of pixels with a luminance component Y and color difference components Cb and Cr, or may be of a RGB data format. The image capturing section 110 outputs the captured image 111 (digital image data) obtained by image capturing to the image processing section 120.

The image processing section 120 includes a circuit for performing a predetermined processing process on the captured image 111 input from the image capturing section 110. According to the presupposed technology 1, the image processing section 120 performs a predetermined processing process on the captured image 111 input from the image capturing section 110 in a case where a control signal instructing the image processing section 120 to segment ROIs is input from the video receiving apparatus 200 through the camera control interface CCI. However, the presupposed technology 1 is also applicable where the video transmitting apparatus 100, i.e., the transmission side, gives an instruction as to coordinates for segmenting ROIs. In this case, the transmission side receives information representing "persons" or "objects" to be acquired by ROIs sent out from the reception side, and makes a decision and gives an instruction as to segmenting coordinates, for example. The video receiving apparatus 200 thus generates various kinds of data (120A, 120B and 120C) and outputs them to the transmitting section 140. The image processing section 130 includes a circuit for performing a predetermined processing process on the captured image 111 input from the image capturing section 110. The image processing section 130 performs a predetermined processing process on the captured image 111 input from the image capturing section 110 in a case where a control signal instructing the image processing section 130 to output normal images is input from the video receiving apparatus 200 through the camera control interface CCI. The image processing section 130 thus generates image data 130A and outputs them to the transmitting section 140.

The image processing section 130 has an encoding section 131, for example. The encoding section 131 encodes the captured image 111 to generate compressed image data 130A. The image processing section 130 compresses the captured image 111 in a compression format that conforms to the JPEG (Joint Photographic Experts Group) standards, for example, as the format of the compressed image data 130A.

The image processing section 120 has a ROI segmenting section 121, a ROI analyzing section 122, an overlap detecting section 123, a priority setting section 124, an encoding section 125, and an image processing controlling section 126, for example.

The ROI segmenting section 121 specifies an image or a plurality of images as an imaging target or targets included in the captured image 111 input from the image capturing section 110, and establishes a region of interest ROI per specified object. A region of interest ROI refers to a square-shaped region including a specified object, for example. The ROI segmenting section 121 specifies an image of each region of interest ROI (for example, a ROI image 112 in FIG. 3) from the captured image 111. The ROI segmenting section 121 further assigns a region number as an identifier to each established region of interest ROI. For example, in a case where the ROI segmenting section 121 has established two regions of interest ROI in the captured image 111, the ROI segmenting section 121 assigns a region number 1 to one of the regions of interest ROI (for example, a region of interest ROI1 in FIG. 3) and assigns a region number 2 to the other region of interest ROI (for example, a region of interest ROI2 in FIG. 3). The ROI segmenting section 121 stores the assigned identifiers (region numbers) in a storage section, for example. For example, the ROI segmenting section 121 stores each ROI image 112 segmented from the captured image 111 in the storage section. Furthermore, for example, the ROI segmenting section 121 stores the identifier (region number) assigned to each region of interest ROI, in the storage section in association with the ROI image 112.

The ROI analyzing section 122 derives positional information 113 of each region of interest ROI in the captured image 111. The positional information 113 includes, for example, the left upper end coordinates (Xa, Ya) of the region of interest ROI, the length in an X-axis direction of the region of interest ROI, and the length in a Y-axis direction of the region of interest ROI. The length in the X-axis direction of the region of interest ROI refers, for example, to the physical region length XLa in the X-axis direction of the region of interest ROI. The length in the Y-axis direction of the region of interest ROI refers, for example, to the physical region length YLa in the Y-axis direction of the region of interest ROI. The physical region length represents the physical length, i.e., data length, of the region of interest ROI. The positional information 113 may include the coordinates of a position different from the left upper end of the region of interest ROI. The ROI analyzing section 122 stores the derived positional information in the storage section, for example. The ROI analyzing section 122 stores the derived positional information in the storage section in association with the identifier, i.e., region number, assigned to the region of interest ROI.

The ROI analyzing section 122 may further derive, as the positional information 113 per region of interest ROI, the output region length XLc in the X-axis direction of the region of interest ROI and the output region length YLc in the Y-axis direction of the region of interest ROI, for example. The output region length represents the physical length, i.e., data length, of the region of interest ROI after the resolution of the region of interest ROI has been changed by a decimating process or an addition of pixels, for example. The ROI analyzing section 122 may derive, for example, as the positional information 113 per region of interest ROI, sensing information, exposure information, gain information, AD (Analog-Digital) word length, image format, etc., for example, and store them in the storage section.

The sensing information refers to the contents of calculations about objects included in the region of interest ROI and additional information of a subsequent signal processing process on the ROI image 112. The exposure information refers to an exposure time of the region of interest ROI. The gain information refers to gain information of the region of interest ROI. The AD word length refers to the word length of data per pixel AD-converted in the region of interest ROI. The image format refers to the format of the image of the region of interest ROI. The ROI analyzing section 122 may, for example, derive the number of regions of interest ROI (the number of ROIs) included in the captured image 111 and store the number of ROIs in the storage section.

When a plurality of objects is specified as imaging targets in the captured image 111, the overlap detecting section 123 detects a region of overlap (ROO (Region of Overlap)) where two or more regions of interest ROI overlap each other on the basis of the positional information 113 of a plurality of regions of interest ROI in the captured image 111. Specifically, the overlap detecting section 123 derives positional information 114 of each region of overlap ROO in the captured image 111. The overlap detecting section 123 stores the derived positional information 114 in the storage section, for example. For example, the overlap detecting section 123 stores the derived positional information 114 in the storage section in corresponding relation to the region of overlap ROO. The region of overlap ROO refers to a square-shaped region identical or smaller in size to the smallest region of interest ROI among two or more regions of interest ROI that overlap each other. The positional information 114 includes, for example, the left upper end coordinates (Xb, Yb) of the region of overlap ROO, the length in the X-axis direction of the region of overlap ROO, and the length in the Y-axis direction of the region of overlap ROO. The length in the X-axis direction of the region of overlap ROO refers, for example, to the physical region length XLb. The length in the Y-axis direction of the region of overlap ROO refers, for example, to the physical region length YLb. The positional information 114 may include the coordinates of a position different from the left upper end of the region of interest ROI.

The priority setting section 124 assigns a priority 115 to each region of interest ROI in the captured image 111. The priority setting section 124 stores the assigned priority 115 in the storage section, for example. For example, the priority setting section 124 stores the assigned priority 115 in the storage section in corresponding relation to the region of interest ROI. The priority setting section 124 may assign a priority 115 to each region of interest ROI separately from the region number assigned to each region of interest ROI, or may use the region number assigned to each region of interest ROI instead of a priority 115. The priority setting section 124 may, for example, store the priority 115 in the storage section in association with the region of interest ROI or may store the region number assigned to each region of interest ROI in the storage section in association with the region of interest ROI.

The priority 115 refers to an identifier of each region of interest ROI, and represents discriminating information for discriminating which one of a plurality of regions of interest ROI in the captured image 111 a region of overlap ROO has been eliminated from. For example, the priority setting section 124 assigns "1" as a priority 115 to one of two regions of interest ROI each including a region of overlap ROO and assigns "2" as a priority 115 to the other region of interest ROI. In this case, a region of overlap ROO is eliminated with respect to a region of interest ROI where the numerical value of the priority 115 is larger in generating a transmission image 116 to be described later. Incidentally, the priority setting section 124 may assign the same number as the region number assigned to each region of interest ROI as a priority 115 to the region of interest ROI. For example, the priority setting section 124 stores the priority 115 assigned to each region of interest ROI in the storage section in association with the ROI image 112.

The encoding section 125 encodes each transmission image 116 to generate compressed image data 120A. The encoding section 125 compresses each transmission image 116 in a compression format that conforms to the JPEG standards, for example, as the format of the compressed image data 120A. Before performing the above compression process, the encoding section 125 generates each transmission image 116. In order that an image 118 of a region of overlap ROO will not overlappingly be included in a plurality of ROI images 112 obtained from the captured image 111, the encoding section 125 generates a plurality of transmission images 116 where the image 118 has been eliminated from the plurality of ROI images 112 obtained from the captured image 111.

The encoding section 125 determines which one of a plurality of ROI images 112 the image 118 is to be eliminated from, on the basis of the priority 115 assigned to each region of interest ROI, for example. The encoding section 125 may determine, for example, which one of a plurality of ROI images 112 the image 118 is to be eliminated from, by using the region number assigned to each region of interest ROI as a priority 115. The encoding section 125 uses the ROI image 112 as specified above from which the image 118 has been eliminated as a transmission image 116 (for example, a transmission image 116a2 in FIG. 3). The encoding section 125 uses the ROI image 112 that does not include a region of overlap ROO or the ROI image 112 which the image 118 has not been eliminated from as determined above, as a transmission image 116 (for example, a transmission image 116a1 in FIG. 3).

The image processing controlling section 126 generates ROI information 120B and frame information 120C and transmits them to the transmitting section 140. The ROI information 120B includes each positional information 113, for example. Furthermore, the ROI information 120B includes at least one of the data type of each region of interest ROI, the number of regions of interest ROI included in the captured image 111, the region number (or the priority 115) of each region of interest ROI, the data length of each region of interest ROI, and the image format of each region of interest ROI. The frame information 120C includes the number of a virtual channel assigned to each frame, the data type of each region of interest ROI, the payload length per line, etc., for example. The data type includes YUV data, RGB data, or RAW data, for example. Furthermore, the data type includes data of the ROI format, data of the normal format, etc., for example. The payload length represents the number of pixels included in the payload of a long packet, e.g., the number of pixels per region of interest ROI. The payload refers to major data (application data) transmitted between the video transmitting apparatus 100 and the video receiving apparatus 200. The long packet refers to a packet disposed between a packet header PH and a packet footer PF.

The transmitting section 140 includes a circuit for generating and sending out transmission data 147A on the basis of various kinds of data (data 120A, 120B, 120C and 130A) input from the image processing sections 120 and 130. The transmitting section 140 sends out the ROI information 120B regarding each region of interest ROI in the captured image 111 as embedded data. Furthermore, in a case where a control signal indicating the segmentation of ROIs is input from the video receiving apparatus 200 via the camera control interface CCI, the transmitting section 140 sends out the image data (compressed image data 120A) of each region of interest ROI as the payload data of a long packet. At this time, the transmitting section 140 sends out the image data (compressed image data 120A) of each region of interest ROI in a common virtual channel. Furthermore, the transmitting section 140 sends out the image data (compressed image data 120A) of each region of interest ROI as an image data frame, and sends out the ROI information 120B regarding each region of interest ROI as the header of an image data frame. Furthermore, in a case where a control signal indicating the outputting of a normal image is input from the video receiving apparatus 200 via the camera control interface CCI, the transmitting section 140 sends out normal image data (compressed image data 130A) as the payload data of a long packet.

The transmitting section 140 has a LINK controlling section 141, an ECC generating section 142, a PH generating section 143, an EBD buffer 144, a ROI data buffer 145, a normal image data buffer 146, and a combining section 147. In a case where a control signal indicating the segmentation of ROIs is input from the video receiving apparatus 200 via the camera control interface CCI, the LINK controlling section 141, the ECC generating section 142, the PH generating section 143, the EBD buffer 144, and the ROI data buffer 145 output data to the combining section 147. In a control signal indicating the outputting of a normal image is input from the video receiving apparatus 200 via the camera control interface CCI, the normal image data buffer 146 outputs data to the combining section 147.

It is noted that the ROI data buffer 145 may doubles as the normal image data buffer 146. In this case, the transmitting section 140 may have a selector for selecting the output from either one of the ROI data buffer 145 and the ROI data buffer 145, between the output terminals of the ROI data buffer 145 and the ROI data buffer 145 and an input terminal of the combining section 147.

Figure 4:
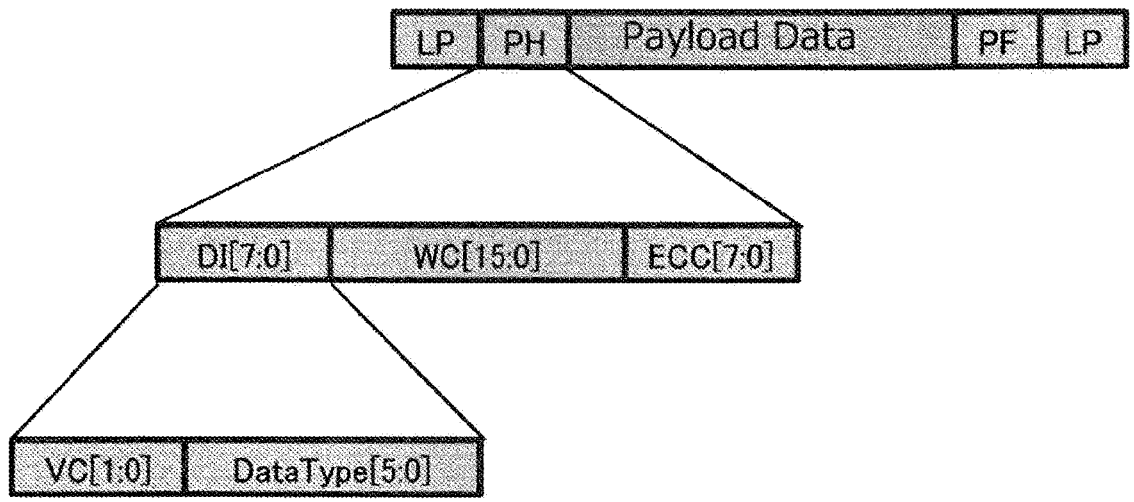
FIG. 4 is a diagram illustrating a configurational example of a packet header.

The LINK controlling section 141 outputs the frame information 120C per line to the LINK controlling section 141 and the ECC generating section 142, for example. The ECC generating section 142 generates an error correcting code for a line in the frame information 120C, for example, on the basis of the data of the line, e.g., the number of the virtual channel, the data type of each region of interest ROI, the payload length per line, etc. The ECC generating section 142 outputs the generated error correcting code to the PH generating section 143, for example. The PH generating section 143 generates a packet header PH per line using the frame information 120C and the error correcting code generated by the ECC generating section 142, for example. At this time, as illustrated in FIG. 4, for example, the packet header PH includes a packet header of the payload data of a long packet. The packet header PH includes DI, WC, and ECC, for example. WC represents an area for indicating the end of a packet with the number of words to the video receiving apparatus 200. WC includes a payload length, for example, and includes the number of pixels per region of interest ROI, for example. ECC represents an area for storing a value for correcting a bit error. ECC includes an error correcting code. DI represents an area for storing a data identifier. DI includes the number of a VC (virtual channel) and DataType (data type of each region of interest ROI). VC (virtual channel) refers to a concept introduced for flow control of packets and represents a mechanism for supporting a plurality of independent data streams that share one link. The PH generating section 143 outputs the generated packet header PH to the combining section 147.

The EBD buffer 144 primarily stores ROI information 120B and outputs the ROI information 120B as embedded data to the combining section 147. The embedded data refer to additional information that can be embedded in the header or footer of an image data frame (see FIG. 5 to be described later). The embedded data include ROI information 120B, for example.

The ROI data buffer 145 primarily stores compressed image data 120A and outputs the compressed image data 120A at predetermined timing as the payload data of a long packet to the combining section 147. In a case where a control signal indicating the segmentation of ROIs is input from the video receiving apparatus 200 via the camera control interface CCI, the ROI data buffer 145 outputs the compressed image data 120A as the payload data of a long packet to the combining section 147. The normal image data buffer 146 primarily stores compressed image data 130A and outputs the compressed image data 130A at predetermined timing as the payload data of a long packet to the combining section 147. In a case where a control signal indicating the outputting of a normal image is input from the video receiving apparatus 200 via the camera control interface CCI, the normal image data buffer 146 outputs the compressed image data 130A as the payload data of a long packet to the combining section 147.

In a case where a control signal indicating the outputting of a normal image is input from the video receiving apparatus 200 via the camera control interface CCI, the combining section 147 generates transmission data 147A on the basis of input data (compressed image data 130A). The combining section 147 outputs the generated transmission data 147A to the video receiving apparatus 200 via the data lane DL. On the other hand, in a case where a control signal indicating the segmentation of ROIs is input from the video receiving apparatus 200 via the camera control interface CCI, the combining section 147 generates transmission data 147A on the basis of various input data (a packet header PH, ROI information 120B, and compressed image data 120A). The combining section 147 outputs the generated transmission data 147A to the video receiving apparatus 200 via the data lane DL. Specifically, the combining section 147 includes DataType (data type of each region of interest ROI) in the packet header PH of the payload data of a long packet and sends out the data. Furthermore, the combining section 147 sends out image data (compressed image data 120A) of each region of interest ROI in a common virtual channel.

Figure 5:
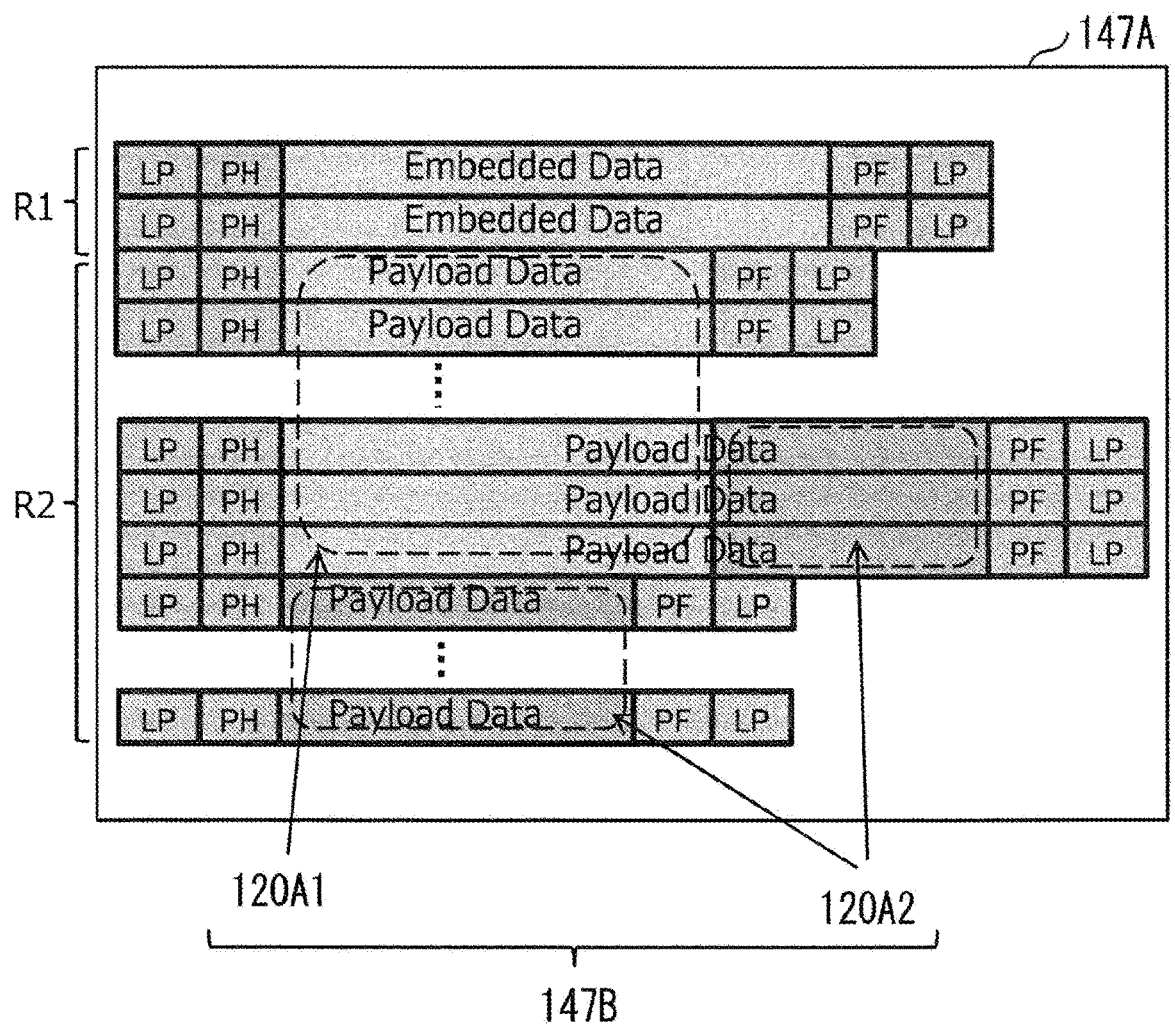
FIG. 5 is a diagram illustrating a configurational example of transmission data.

The transmission data 147A include an image data frame as illustrated in FIG. 5, for example. The image data frame normally has a header area, a packet area, and a footer area. In FIG. 5, the footer area is omitted from illustration for the sake of convenience. The frame header area R1 of the transmission data 147A includes embedded data. At this time, the embedded data include ROI information 120B. In FIG. 5, the packet area R2 of the transmission data 147A includes the payload data of a long packet per line, and also include a packet header PH and a packet footer PF at positions sandwiching the payload data of a long packet. Furthermore, the packet area R2 includes low power modes LP at positions sandwiching the packet header PH and the packet footer PF.

At this time, the packet header PH includes DI, WC, and ECC, for example. WC includes a payload length, for example, and includes the number of pixels per region of interest ROI, for example. ECC includes an error correcting code. DI includes the number of a VC (virtual channel) and DataType (data type of each region of interest ROI). According to the present embodiment, the number of a common virtual channel is assigned to a VC of each line. In FIG. 5, the packet area R2 of the transmission data 147A includes compressed image data 147B. The compressed image data 147B includes one compressed image data 120A or a plurality of compressed image data 120A. Here in FIG. 5, a packet group closer to the packet header PH includes compressed image data 120A (120A1) of the transmission image 116a1 in FIG. 3, and a packet group remoter from the packet header PH includes compressed image data 120A (120A2) of the transmission image 116a2 in FIG. 3. These two compressed image data 120A1 and 120A2 make up the compressed image data 147B. The payload data of a long packet of each line include one line of pixel data in the compressed image data 147B.

Figure 6:
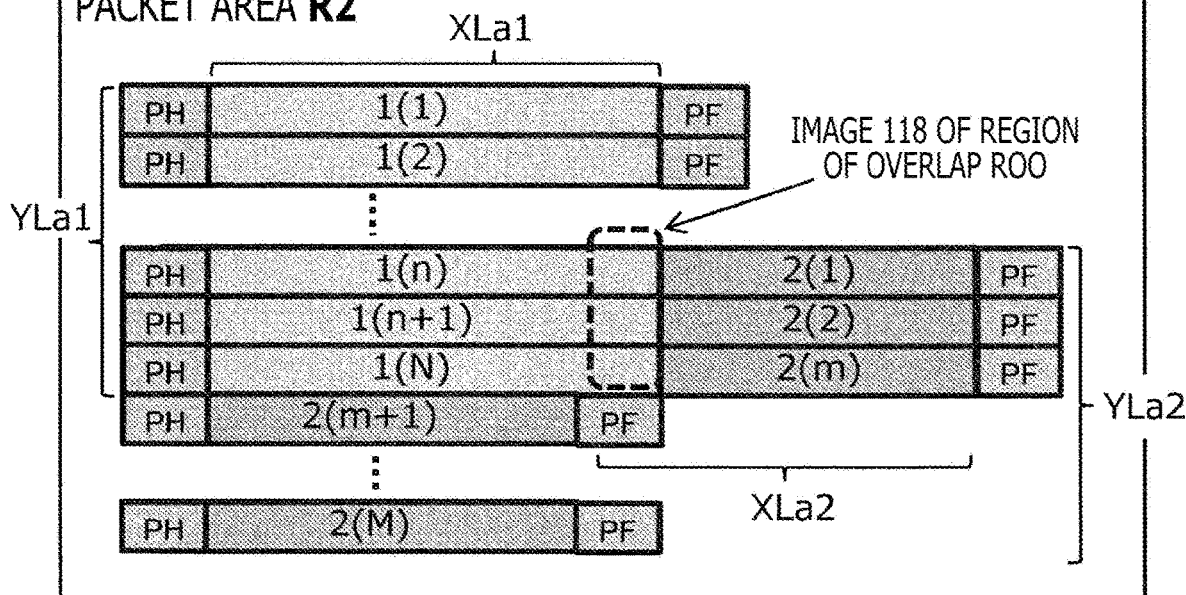
FIG. 6 is a diagram illustrating a configurational example of transmission data.

FIG. 6 illustrates a configurational example of the transmission data 147A. The transmission data 147A include a frame header area R1 and a packet area R2, for example. Incidentally, FIG. 6 illustrates details of the contents of the frame header area R1. Furthermore, low power modes LP are omitted from illustration in FIG. 6.

The frame header area R1 includes a frame number F1 as an identifier of the transmission data 147A, for example. The frame header area R1 includes information regarding compressed image data 147B included in the packet area R2. The frame header area R1 includes, for example, the number of compressed image data 120A (the number of ROIs) included in the compressed image data 147B and information regarding the ROI image 112 (ROI information 120B) corresponding to each compressed image data 120A included in the compressed image data 147B.

The combining section 147 divides and places compressed image data 147B per pixel row of compressed image data 120A in the packet area R2 of the transmission data 147A, for example. Therefore, the packet area R2 of the transmission data 147A does not include overlapping compressed image data corresponding to an image 118 of a region of overlap ROO. Furthermore, the combining section 147 has eliminated therefrom a pixel row not corresponding to each transmission image 116 of the captured image 111 in the packet area R2 of the transmission data 147A, for example. Consequently, the packet area R2 of the transmission data 147A does not include a pixel row not corresponding to each transmission image 116 of the captured image 111. Incidentally, in the packet area R2 in FIG. 6, a zone surrounded by the broken line corresponds to compressed image data of an image 118 of a region of overlap ROO.

The boundary between a packet group closer to the packet header PH (for example, 1(n) in FIG. 6) and a packet group remoter from the packet header PH (for example, 2(1) in FIG. 6) is specified by the physical region length XLa1 of the ROI image 112 corresponding to the compressed image data of the packet group closer to the packet header PH (for example, 1(n) in FIG. 6). A packet starting position in the compressed image data corresponding to an image 118 of a region of overlap ROO included in a packet group closer to the packet header PH (for example, 1(n) in FIG. 6) is specified by the physical region length XLa2 of the ROI image 112 corresponding to a packet group remoter from the packet header PH (for example, 2(1) in FIG. 6).

Figure 7:
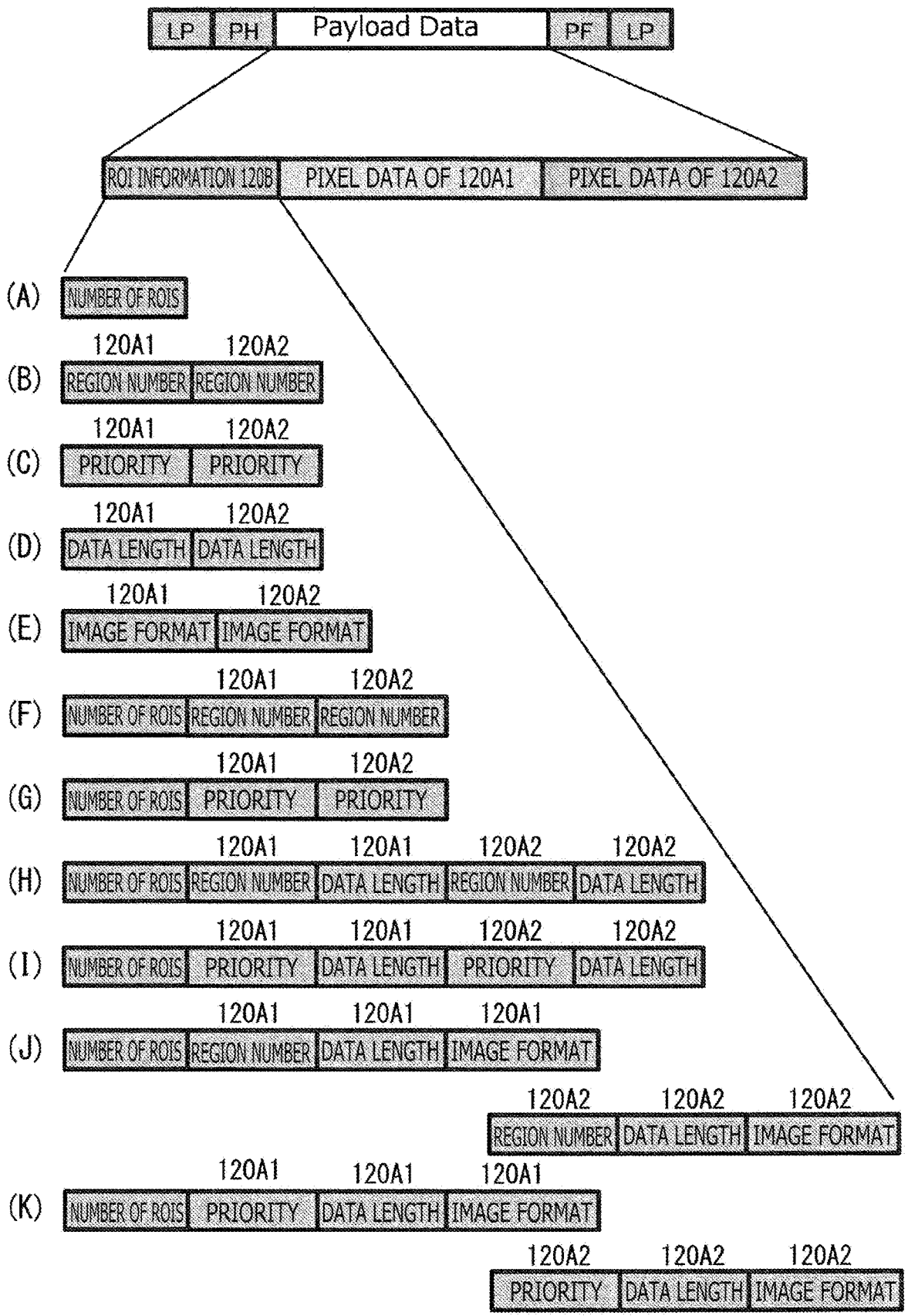
FIG. 7 is a diagram illustrating a configurational example of the payload data of a long packet.

When the payload data of a long packet is to be generated per line in the packet area R2 of the transmission data 147A, for example, the combining section 147 may include ROI information 120B, as illustrated in FIG. 7, for example, other than pixel data of one line in the compressed image data 147B, in the payload data of the long packet. In other words, the combining section 147 may include ROI information 120B in the payload data of a long packet and output the data. At this time, as illustrated in FIG. 7(A) to FIG. 7(K), the ROI information 120B includes at least one of the number of regions of interest ROI (the number of ROIs) included in the captured image 111, the region number (or the priority 115) of each region of interest ROI, the data length of each region of interest ROI, and the image format of each region of interest ROI. The ROI information 120B should preferably be placed in the payload data of a long packet at the end on the packet header PH side (i.e., the leading end of the payload data of the long packet).

(Video Receiving Apparatus 200)

Figure 8:
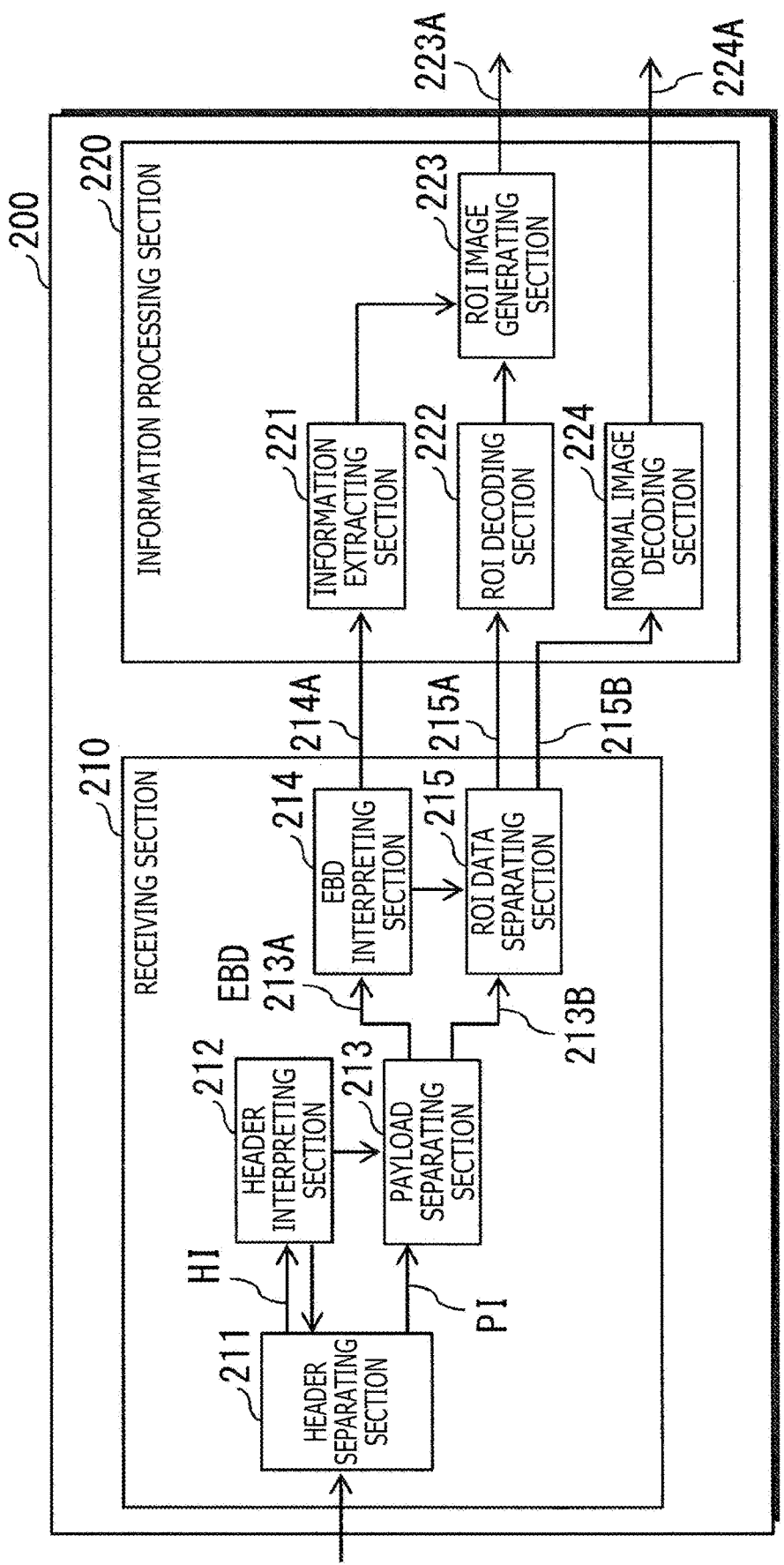
FIG. 8 is a diagram illustrating a general configurational example of a video receiving apparatus illustrated in FIG. 1.
Figure 9:
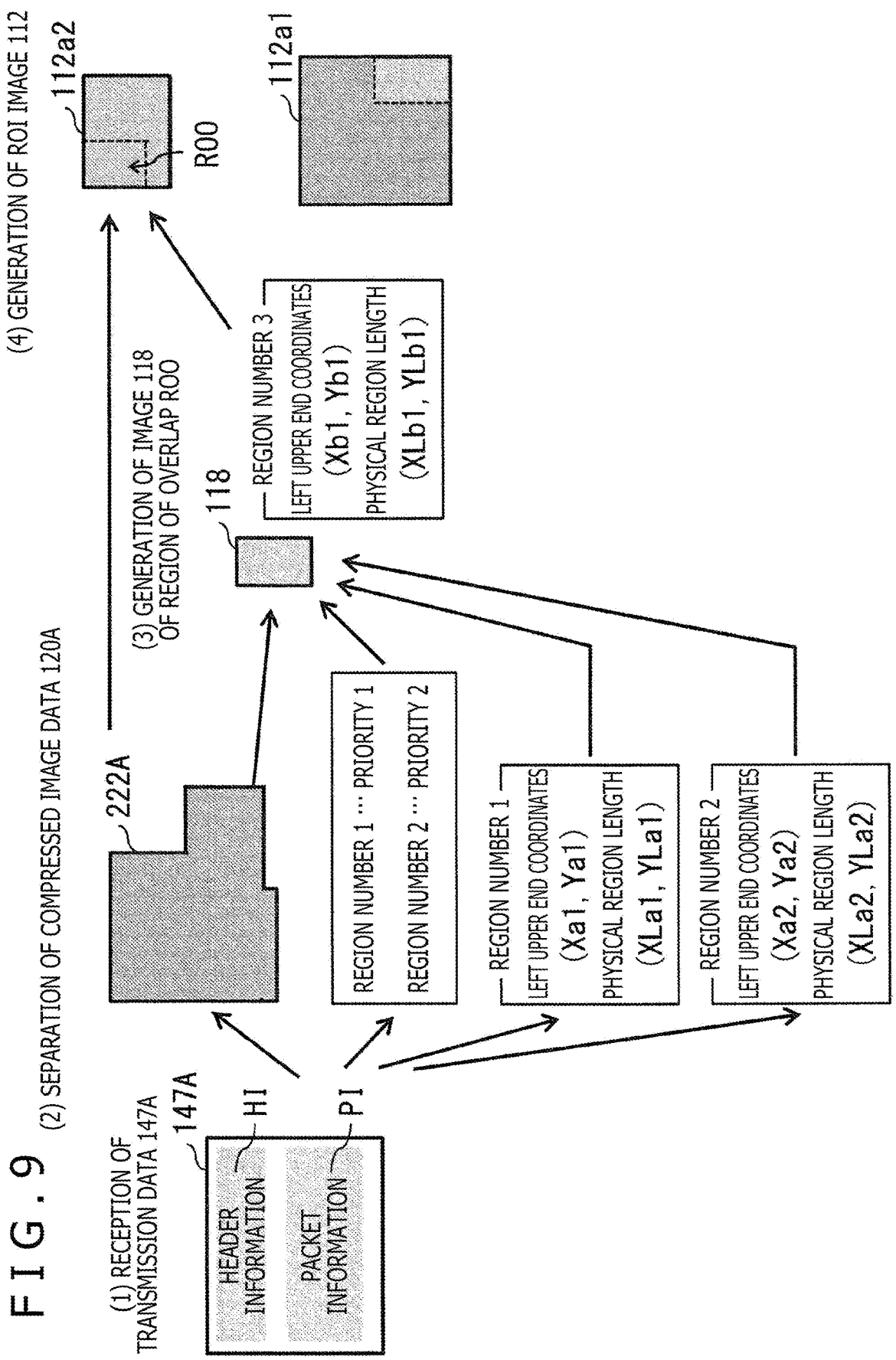
FIG. 9 is a diagram illustrating an example of a procedure for generating two ROI images included in a captured image when two images are included in transmission data.

Next, the video receiving apparatus 200 will be described below. FIG. 8 illustrates a configurational example of the video receiving apparatus 200. FIG. 9 illustrates an example of a procedure for generating a ROI image 223A in the video receiving apparatus 200. The video receiving apparatus 200 includes an apparatus for receiving signals according to standards common to the video transmitting apparatus 100 (for example, the MIPI CSI-2 standards, the MIPI CSI-3 standards, or the MIPI DSI standards). The video receiving apparatus 200 has a receiving section 210 and an information processing section 220. The receiving section 210 includes a circuit for receiving transmission data 147A output from the video transmitting apparatus 100 via the data lane DL, performing a predetermined process on the received transmission data 147A to generate various kinds of data (214A, 215A and 215B), and outputting the generated data to the information processing section 220. The information processing section 220 includes a circuit for generating a ROI image 223A based on various kinds of data (214A and 215A) received from the receiving section 210 and generating a normal image 224A based on data (215B) received from the receiving section 210.

The receiving section 210 has, for example, a header separating section 211, a header interpreting section 212, a payload separating section 213, an EBD interpreting section 214, and a ROI data separating section 215.

The header separating section 211 receives transmission data 147A from the video transmitting apparatus 100 via the data lane DL. Specifically, the header separating section 211 receives transmission data 147A including ROI information 120B regarding each region of interest ROI in the captured image 111 in embedded data and also including image data (compressed image data 120A) of each region of interest ROI in the payload data of a long packet. The header separating section 211 separates the received transmission data 147A into a frame header area R1 and a packet area R2. The header interpreting section 212 specifies the positions of the payload data of long packets included in the packet area R2 on the basis of data (specifically, embedded data) included in the frame header area R1. The payload separating section 213 separates the payload data of the long packets included in the packet area R2 from the packet area R2 on the basis of the positions of the payload data of the long packets that have been specified by the header interpreting section 212.

The EBD interpreting section 214 outputs the embedded data as EBD data 214A to the information processing section 220. Furthermore, the EBD interpreting section 214 discriminates whether the image data included in the payload data of the long packets are the compressed image data 120A of the image data 116 of a ROI or the compressed image data 130A of normal image data, from the data type included in the embedded data. The EBD interpreting section 214 outputs the discriminated result to the ROI data separating section 215.

If the image data included in the payload data of the long packets are the compressed image data 120A of the image data 116 of a ROI, then the ROI data separating section 215 outputs the payload data of the long packet as payload data 215A to the information processing section 220 (specifically, a ROI decoding section 222). If the image data included in the payload data are the compressed image data 130A, then the ROI data separating section 215 outputs the payload data of the long packet as payload data 215A to the information processing section 220 (specifically, a normal image decoding section 224). In a case where the payload data of the long packet include the ROI information 120B, the payload data 215A include the ROI information 120B and one line of pixel data of the compressed image data 147B.

The information processing section 220 extracts the ROI information 120B from the embedded data included in the EBD data 214A. The information processing section 220 extracts an image of each region of interest ROI (ROI image 112) in the captured image 111 from the payload data of the long packet included in the transmission data 147A received by the receiving section 210 on the basis of the ROI information 120B extracted by an information extracting section 221. The information processing section 220 has, for example, the information extracting section 221, the ROI decoding section 222, a ROI image generating section 223, and the normal image decoding section 224.

The normal image decoding section 224 decodes the payload data 215B to generate a normal image 224A. The ROI decoding section 222 decodes the compressed image data 147B included in the payload data 215A to generate image data 222A. The image data 222A represent one transmission image 116 or a plurality of transmission images 116.

The information extracting section 221 extracts the ROI information 120B from the embedded data included in the EBD data 214A. For example, the information extracting section 221 extracts the number of regions of interest ROI included in the captured image 111, the region number (or the priority 115) of each region of interest ROI, the data length of each region of interest ROI, and the image format of each region of interest ROI, for example, from the embedded data included in the EBD data 214A. In other words, the transmission data 147A include the region number (or the priority 115) of a region of interest ROI corresponding to each transmission image 116 as discriminating information for discriminating which one of a plurality of transmission images 116 obtained from the transmission data 147A an image 118 of a region of overlap ROO has been eliminated from.

The ROI image generating section 223 detects a region of overlap ROO where two or more regions of interest ROI overlap each other on the basis of the ROI information 120B obtained by the information extracting section 221.

The information extracting section 221 extracts, for example, coordinates (for example, left upper end coordinates (Xa1, Ya1)), lengths (for example, physical region lengths XLa1 and YLa1), and a region number 1 (or a priority 115 (=1)) of a region of interest ROI corresponding to a ROI image 112a1 from the embedded data included in the EBD data 214A. Furthermore, the information extracting section 221 extracts, for example, coordinates (for example, left upper end coordinates (Xa2, Ya2)), lengths (for example, physical region lengths XLa2, YLa2), and a region number 2 (or a priority 115 (=2)) of a region of interest ROI corresponding to a ROI image 112a2 from the embedded data included in the EBD data 214A.

At this time, the ROI image generating section 223 derives positional information 114 of the region of overlap ROO based on these extracted pieces of information (hereinafter referred to as "extracted information 221A"). The ROI image generating section 223 derives, for example, coordinates (for example, left upper end coordinates Xb1, Yb1) and lengths (for example, physical region lengths XLb1 and YLb1) of the region of overlap ROO as the positional information 114 of the region of overlap ROO.

Incidentally, the ROI image generating section 223 may acquire the ROI information 120B from the payload data 215A instead of acquiring the ROI information 120B from the embedded data included in the EBD data 214A. In this case, the ROI image generating section 223 may detect a region of overlap ROO where two or more regions of interest ROI overlap each other on the basis of the ROI information 120B included in the payload data 215A. Furthermore, the ROI image generating section 223 may extract the extracted information 221A from the ROI information 120B included in the payload data 215A, and may derive the positional information 114 of a region of overlap ROO based on the extracted information 221A thus extracted.

Moreover, the ROI image generating section 223 generates an image (ROI images 112a1 and 112a2) of each region of interest ROI in the captured image 111 on the basis of the image data 222A, the extracted information 221A, and the positional information 114 of the region of overlap ROO. The ROI image generating section 223 outputs the generated images as a ROI image 223A.

[Procedure]

Next, an example of a procedure for transmitting data in the video transmission system 1 will be described below with reference to FIGS. 3 and 9.

First, the image capturing section 110 outputs a captured image 111 (digital image data) obtained by image capturing to the image processing section 120. The ROI segmenting section 121 specifies two regions of interest ROI1 and ROI2 included in the captured image 111 input from the image capturing section 110. The ROI segmenting section 121 segments images of the respective regions of interest ROI1 and ROI2 (ROI images 112a1 and 112a2) from the captured image 111. The ROI segmenting section 121 assigns a region number 1 as an identifier to the region of interest ROI1 and assigns a region number 2 as an identifier to the region of interest ROI2.

The ROI analyzing section 122 derives positional information 113 of each region of interest ROI in the captured image 111. The ROI analyzing section 122 derives left upper coordinates (Xa1, Ya1) of the region of interest ROI1, a length (XLa1) in the X-axis direction of the region of interest ROI1, and a length (YLa1) in the Y-axis direction of the region of interest ROI1 on the basis of the region of interest ROI1. The ROI analyzing section 122 derives left upper coordinates (Xa2, Ya2) of the region of interest ROI2, a length (XLa2) in the X-axis direction of the region of interest ROI2, and a length (YLa2) in the Y-axis direction of the region of interest ROI2 on the basis of the region of interest ROI2.

The overlap detecting section 123 detects a region of overlap ROO where the two regions of interest ROI1 and ROI2 overlap each other on the basis of the positional information 113 of the two regions of interest ROI1 and ROI2 in the captured image 111. Specifically, the overlap detecting section 123 derives positional information 114 of the region of overlap ROO in the captured image 111. The overlap detecting section 123 derives left upper coordinates (Xb1, Yb1) of the region of overlap ROO, a length (XLb1) in the X-axis direction of the region of overlap ROO, and a length (YLb1) in the Y-axis direction of the region of overlap ROO as the positional information 114 of the region of overlap ROO in the captured image 111.

The priority setting section 124 assigns "1" as a priority 115 to the region of interest ROI1 that is one of the two regions of interest ROI1 and ROI2, and assigns "2" as a priority 115 to the other region of interest ROI2.

The encoding section 125 generates two transmission images 116a1 and 116a2 where an image 118 of the region of overlap ROO has been eliminated from the two ROI images 112a1 and 112a2 obtained from the captured image 111, in order that the image 118 will not overlappingly be included in the two regions of interest ROI1 and ROI2.

The encoding section 125 determines which one of the two ROI images 112a1 and 112a2 the image 118 is to be eliminated from on the basis of region numbers (or the priority 115) of the two regions of interest ROI1 and ROI2. The encoding section 125 eliminates the image 118 from the ROI image 112a2 corresponding to the region of interest ROI2 whose region number (or the priority 115) is larger among the two regions of interest ROI1 and ROI2, thereby generating a transmission image 116a2. The encoding section 125 uses the ROI image 112a1 itself corresponding to the region of interest ROI1 whose region number (or the priority 115) is smaller among the two regions of interest ROI1 and ROI2, as a transmission image 116a1.

The image processing controlling section 126 generates ROI information 120B and frame information 120C and transmits them to the transmitting section 140. The transmitting section 140 generates transmission data 147A based on various kinds of data (120A, 120B, 120C and 130A) input from the image processing sections 120 and 130. The transmitting section 140 sends out the generated transmission data 147A to the video receiving apparatus 200 via the data lane DL.

The receiving section 210 receives the transmission data 147A output from the video transmitting apparatus 100 via the data lane DL. The receiving section 210 performs a predetermined process on the received transmission data 147A to generate EBD data 214A and payload data 215A and outputs them to the information processing section 220.

The information extracting section 221 extracts ROI information 120B from the embedded data included in the EBD data 214A. The information extracting section 221 extracts coordinates (for example, left upper end coordinates (Xa1, Ya1)), lengths (for example, physical region lengths XLa1 and YLa1), and a region number 1 (or a priority 115 (=1)) of the region of interest ROI corresponding to the ROI image 112a1 from the embedded data included in the EBD data 214A. Furthermore, the information extracting section 221 extracts coordinates (for example, left upper end coordinates (Xa2, Ya2)), lengths (for example, physical region lengths XLa2, YLa2), and a region number 2 (or a priority 115 (=2)) of the region of interest ROI corresponding to the ROI image 112a2 from the embedded data included in the EBD data 214A. The ROI decoding section 222 decodes the compressed image data 147B included in the payload data 215A to generate image data 222A.

The ROI image generating section 223 derives the positional information 114 of the region of overlap ROO based on the extracted pieces of information (extracted information 221A). The ROI image generating section 223 extracts, for example, coordinates (for example, left upper end coordinates Xb1, Yb1) and lengths (for example, physical region lengths XLb1 and YLb1) of the region of overlap ROO as the positional information 114 of the region of overlap ROO. Furthermore, the ROI image generating section 223 generates an image (ROI images 112a1 and 112a2) of each region of interest ROI in the captured image 111 on the basis of the image data 222A, the extracted information 221A, and the positional information 114 of the region of overlap ROO.

[Advantages]

Next, advantages of the video transmission system 1 according to the present embodiment will be described below.

In recent years, there have been growing applications in which large amounts of data are transmitted in bulk. Such applications tend to pose large loads on the transmission system, possibly causing the transmission system to go down in worst-case scenarios and fail to perform data transmission.

To avoid transmission system shutdowns, it has customary in the art to specify an object as an imaging target and transmit only a partial image of the specified object that has been segmented, rather than transmitting an entire captured image.

Incidentally, MIPI CS1-2 may be used as a process of transmitting data from an image sensor to an application sensor. It may not be easy to transmit ROIs according to this process due to various limitations.

On the other hand, according to the present embodiment, ROI information 120B regarding each region of interest ROI in the captured image 111 is sent out as embedded data, and image data of each region of interest ROI are sent out as the payload data of a long packet. Therefore, an apparatus (video receiving apparatus 200) that has received transmission data 147A sent out from the video transmitting apparatus 100 can easily extract the image data (ROI image 112) of each region of interest ROI from the transmission data 147A. As a result, it is possible to transmit regions of interest ROIs regardless of various limitations.

According to the present embodiment, furthermore, the image data (compressed image data 120A) of each region of interest ROI are sent out in a common virtual channel. Since a plurality of ROI images 112 can thus be sent in one packet, it is not necessary to enter an LP mode while the plurality of ROI images 112 is being sent, resulting in a high transmission efficiency.

According to the present embodiment, moreover, a data type of each region of interest ROI is included in the packet header PH of the payload data of the long packet and sent. Therefore, the data type of each region of interest ROI can be obtained simply by accessing the packet header PH of the payload data of the long packet, rather than accessing the embedded data. Inasmuch as this increases the processing rate of the video receiving apparatus 200, a high transmission efficiency can be achieved.

According to the present embodiment, furthermore, in a case where the ROI information 120B is included in the payload data of a long packet and sent, the ROI information 120B can be obtained simply by accessing the payload data of the long packet, rather than accessing the embedded data.

Inasmuch as this increases the processing rate of the video receiving apparatus 200, a high transmission efficiency can be achieved.

According to the present embodiment, moreover, the ROI information 120B regarding each region of interest ROI is extracted from the embedded data included in the transmission data 147A and an image of each region of interest ROI (ROI image 112) is extracted from the payload data of the long packet include in the transmission data 147A on the basis of the extracted ROI information 120B. This allows the image of each region of interest ROI (ROI image 112) to be easily extracted from the transmission data 147A. As a result, it is possible to transmit regions of interest ROIs regardless of various limitations.

2. Technology 2 that is Presupposed for the Present Disclosure

Figure 10:
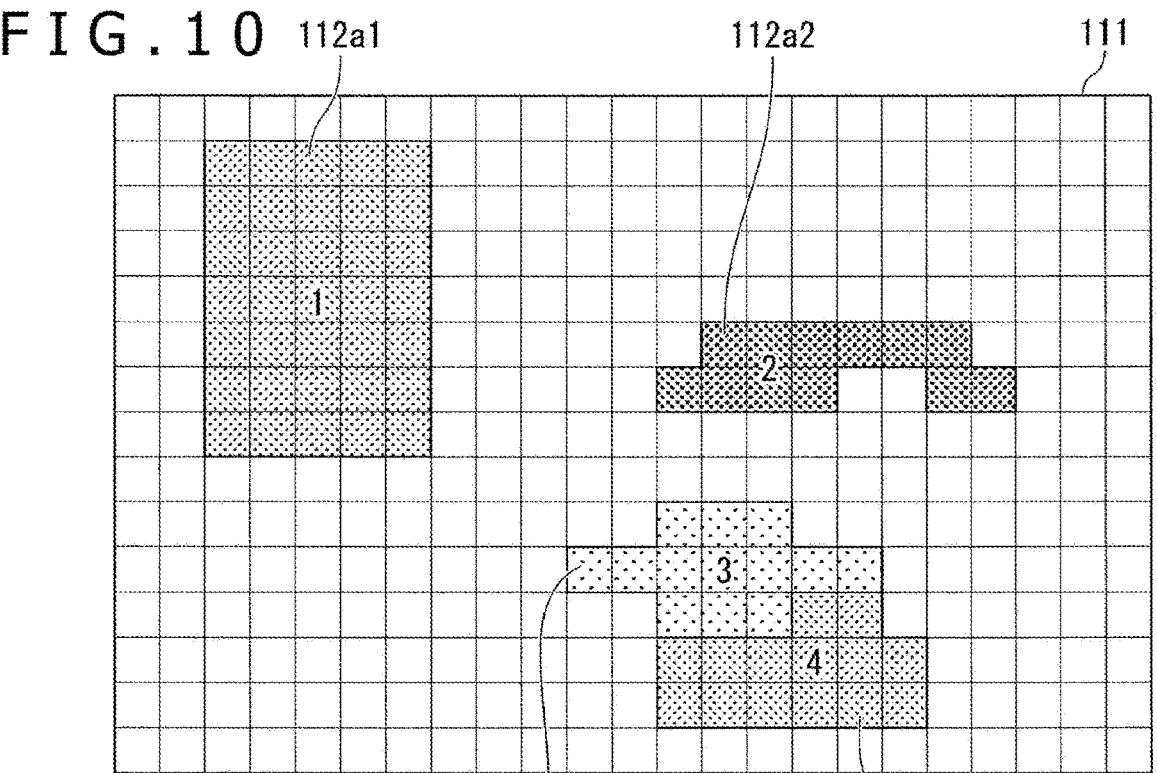
FIG. 10 is a diagram schematically illustrating regions where objects specified in a captured image are placed.
Figure 11:
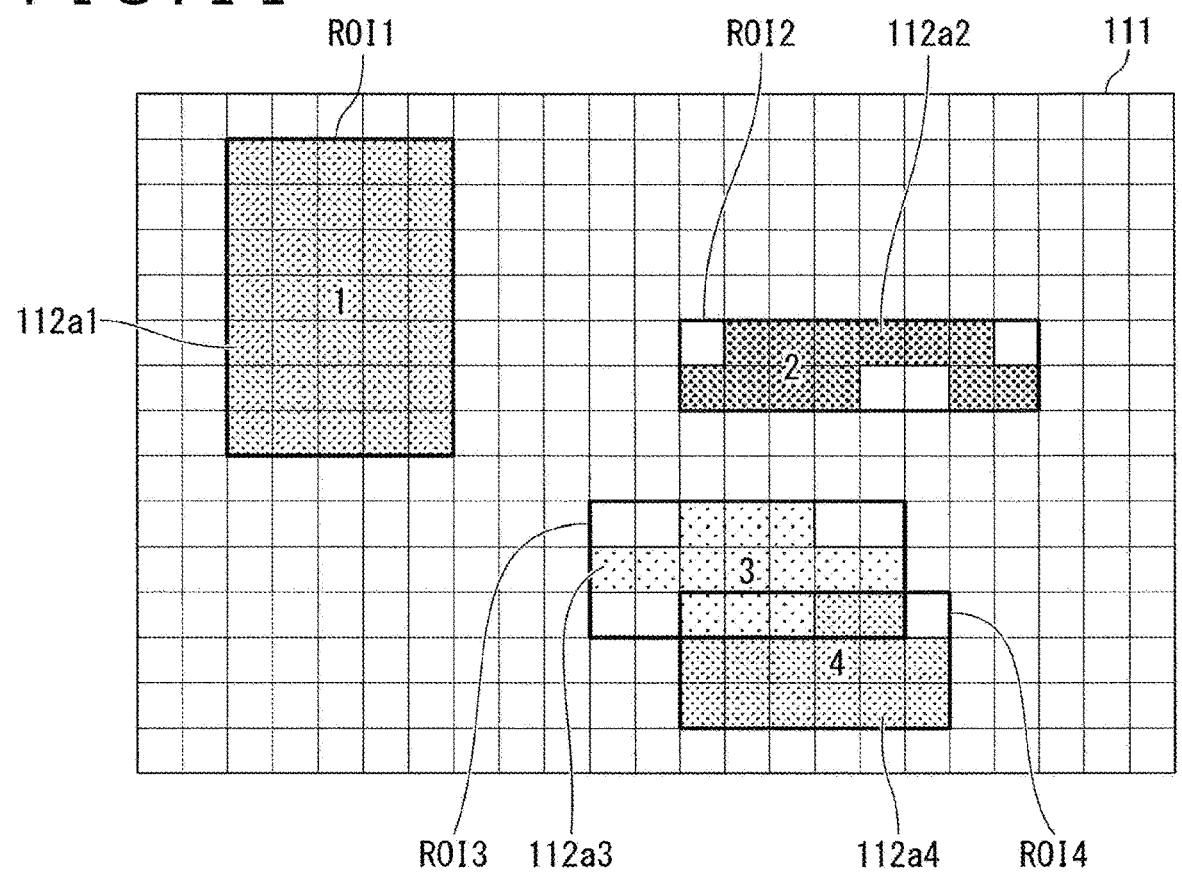
FIG. 11 is a diagram illustrating an example of ROIs established with respect to the specified objects.

A technology for transmitting a region of interest (ROI) as a partial region (non-rectangular in shape) segmented from a captured image will be described below using FIGS. 10 through 12 with reference to FIGS. 1 through 9. Specifically, a technology for transmitting and receiving an image of an object as an imaging target that is of a shape other than a square shape (rectangular shape) will be described below. FIG. 10 is a diagram schematically illustrating regions where objects specified in a captured image 111 are placed. For an easier understanding, FIG. 10 depicts the captured image 111 that is captured in an image capturing region including image capturing elements arranged in 15 rows×23 columns. FIG. 11 is a diagram illustrating an example of ROIs established with respect to the specified objects.

According to the presupposed technology 2, as with the presupposed technology 1, there will be described a situation where a predetermined process is performed on the captured image 111 input from the image capturing section 110 in a case where a control signal indicating the segmentation of ROIs is input from the video receiving apparatus 200 via the camera control interface CCI to the video transmitting apparatus 100. However, the presupposed technology 2 is also applicable to a situation where the video transmitting apparatus 100, i.e., the transmission side, indicates coordinates for segmenting ROIs. In such a case, the transmission side is configured to receive information representing "persons" or "objects" to be acquired by ROIs sent out from the reception side, and to make a decision and give an instruction as to segmenting coordinates, for example.

A control signal indicating the segmentation of ROIs is input from the video receiving apparatus 200 via the camera control interface CCI. In response to the control signal, as illustrated in FIG. 10, the ROI segmenting section 121 specifies four objects 1 through 4 included as imaging targets in the captured image 111. The object 1 has a rectangular shape taking up a portion of a left upper region of the captured image 111, for example. The object 2 has a shape taking up a partial region on the right side of the object 1 in the captured image 111 and devoid of both side corners of an upper side of a rectangular shape and a portion of a lower side thereof, for example. The object 3 has a shape taking up a partial region below the object 2 in the captured image 111 and devoid of four corners of a rectangular shape, for example. The object 4 has a shape taking up a partial region below the object 3 in the captured image 111 and devoid of both side corners of an upper side of a rectangular shape, for example. The object 3 and the object 4 partly overlap each other.

As illustrated in FIG. 11, the ROI segmenting section 121 (see FIG. 2) establishes minimum rectangular shapes including the specified objects as regions of interest ROI1 through ROI4, respectively. The ROI segmenting section 121 establishes the region of interest ROI1 for the object 1 and segments a ROI image 112$a$1. Furthermore, the ROI segmenting section 121 establishes the region of interest ROI2 for the object 2 and segments a ROI image 112$a$2. Furthermore, the ROI segmenting section 121 establishes the region of interest ROI3 for the object 3 and segments a ROI image 112$a$3. Furthermore, the ROI segmenting section 121 establishes the region of interest ROI4 for the object 4 and segments a ROI image 112$a$4.

The ROI segmenting section 121 stores the region of interest ROI1 and a region number "1" assigned to the region of interest ROI1 in the storage section in association with each other. The ROI segmenting section 121 stores the region of interest ROI2 and a region number "2" assigned to the region of interest ROI2 in the storage section in association with each other. The ROI segmenting section 121 stores the region of interest ROI3 and a region number "3" assigned to the region of interest ROI3 in the storage section in association with each other. The ROI segmenting section 121 stores the region of interest ROI4 and a region number "4" assigned to the region of interest ROI4 in the storage section in association with each other.

The ROI analyzing section 122 (see FIG. 2) derive positional information of the respective regions of interest ROI1 through ROI4. The ROI analyzing section 122 derives a physical region length XLa1 in the X-axis direction and a physical region length YLa1 in the Y-axis direction, for example, as the positional information of the region of interest ROI1. The ROI analyzing section 122 derives a physical region length XLa2 in the X-axis direction and a physical region length YLa2 in the Y-axis direction, for example, as the positional information of the region of interest ROI2. The ROI analyzing section 122 derives a physical region length XLa3 in the X-axis direction and a physical region length YLa3 in the Y-axis direction, for example, as the positional information of the region of interest ROI3. The ROI analyzing section 122 derives a physical region length XLa4 in the X-axis direction and a physical region length YLa4 in the Y-axis direction, for example, as the positional information of the region of interest ROI4. Furthermore, the ROI analyzing section 122 may derive, as positional information 113 of each region of interest ROI, an output region length XLc in the X-axis direction of the region of interest ROI and an output region length YLc in the Y-axis direction of the region of interest ROI, for example.

The ROI analyzing section 122 derives sizes and total amounts of data of the respective regions of interest ROI1 through ROI4 as information for a subsequent stage by deriving the lengths in the X-axis direction and the Y-axis directions of the respective regions of interest ROIs. The video receiving apparatus 200 that represents the subsequent stage can thus secure a memory space.

The ROI analyzing section 122 is configured to derive positional information of the ROI images 112$a$l through 112$a$4, not the positional information of the regions of interest ROI, in a case where the objects as imaging targets and the regions of interest do not agree with each other in shape. The ROI analyzing section 122 derives left end coordinates (xn, yn) and physical region lengths XLn in the X-axis direction of the respective rows as the positional information of the ROI images 112$a$1 through 112$a$4. Furthermore, in a case where a ROI image is separated as in the second row of the ROI image 112a2, the ROI analyzing section 122 derives respective positional information of the separated portions. The ROI analyzing section 122 stores the region numbers of the regions of interest ROI1 through ROI4 and the positional information of the ROI images 112a1 through 112a4 in the storage section in association with each other.

Moreover, the ROI analyzing section 122 may derive sensing information, exposure information, gain information, AD word length, image format, etc., for example, other than the positional information, of the respective regions of interest ROI1 through ROI4, and store them in the storage section in association with the region numbers.

In a case where objects as imaging targets are of a rectangular shape, the overlap detecting section 123 (see FIG. 2) derives a region where ROI images overlap each other, not a region where regions of interest overlap each other, as a region of overlap. As illustrated in FIG. 11, the overlap detecting section 123 derives a region of overlap ROO as a region where the ROI image 112a3 and the ROI image 123a4 overlap each other. The overlap detecting section 123 stores the derived region of overlap ROO in the storage section in association with the respective positional information of the regions of interest ROI3 and ROI4.

The priority setting section 124 (see FIG. 2) assigns the priority "1" to the region of interest ROI1, and stores the priority "1" in the storage section in association with the region of interest ROI1. The priority setting section 124 assigns the priority "2" that is lower than the priority "1" to the region of interest ROI2, and stores the priority "2" in the storage section in association with the region of interest ROI2. The priority setting section 124 assigns the priority "3" that is lower than the priority "2" to the region of interest ROI3, and stores the priority "3" in the storage section in association with the region of interest ROI3. The priority setting section 124 assigns the priority "4" that is lower than the priority "3" to the region of interest ROI4, and stores the priority "4" in the storage section in association with the region of interest ROI4.

The encoding section 125 (see FIG. 2) generates respective transmission images of the ROI images 112a1 through 112a4. Since the priority of the region of interest ROI4 is lower than the priority of the region of interest ROI3, the encoding section 125 generates a transmission image by eliminating the region of overlap ROO from the ROI image 112a4.

The image processing controlling section 126 (see FIG. 2) generates ROI information and frame information and transmits them to the transmitting section 140 (see FIG. 2). The ROI information includes the respective positional information of the ROI images 112a1 through 112a4, for example. The ROI information also includes, other than the positional information, information (for example, the respective data types of the regions of interest ROI1 through ROI4, the number of the regions of interest ROI1 through ROI4 included in the captured image 111, the region numbers and priority of the regions of interest ROI1 through ROI4, etc.) similar to those in a case where objects as imaging targets are of a rectangular shape. The frame information includes, for example, information similar to those in a case where objects as imaging targets are of a rectangular shape, such as data types of the regions of interest ROI1 through ROI4.

The LINK controlling section 141 provided in the transmitting section 140 (see FIG. 2) outputs the frame information and the ROI information input from the image processing controlling section 126 per line to the ECC generating section 142 and the PH generating section 143 (see FIG. 2 for both). The ECC generating section 142 generates an error correcting code for a line in the frame information on the basis of data of the line (for example, the number of the virtual channel, the respective data types of the regions of interest ROI1 through ROI4, the payload length per line, etc.), for example. The ECC generating section 142 outputs the generated error correcting code to the PH generating section 143, for example. The PH generating section 143 generates a packet header PH (see FIG. 4) per line, using the frame information and the error correcting code generated by the ECC generating section 142.

The EBD buffer 144 (see FIG. 2) primarily stores the ROI information and outputs the ROI information at predetermined timing as embedded data to the combining section 147 (see FIG. 2).

The ROI data buffer 145 (see FIG. 2) primarily stores the compressed image data input from the encoding section 125 and outputs the compressed image data 120A as the payload data of a long packet to the combining section 147 in a case where a control signal indicating the segmentation of ROIs is input from the video receiving apparatus 200 via the camera control interface CCI.

In a case where a control signal indicating the segmentation of ROIs is input from the video receiving apparatus 200 via the camera control interface CCI, the combining section 147 generates transmission data 147A based on various input data (the packet header PH, the ROI information, and the compressed image data input from the encoding section 125 via the ROI data buffer 145. The combining section 147 outputs the generated transmission data 147A to the video receiving apparatus 200 via the data lane DL. Specifically, the combining section 147 includes the respective data types of the regions of interest ROI1 through ROI4 in the packet header PH of the payload data of a long packet and sends out the data. Furthermore, the combining section 147 sends out the respective image data (compressed image data) of the regions of interest ROI1 through ROI4 in a common virtual channel.

In a case where objects as imaging targets are not of a rectangular shape, the positional information of the ROI images 112a1 through 112a4 is included in the packet header PH or the payload data of a long packet. The positional information of the ROI images 112a1 through 112a4 is included in the packet header PH by the PH generating section 143. On the other hand, the positional information of the ROI images 112a1 through 112a4 is included in the payload data of a long packet by the combining section 147.

Figure 12:
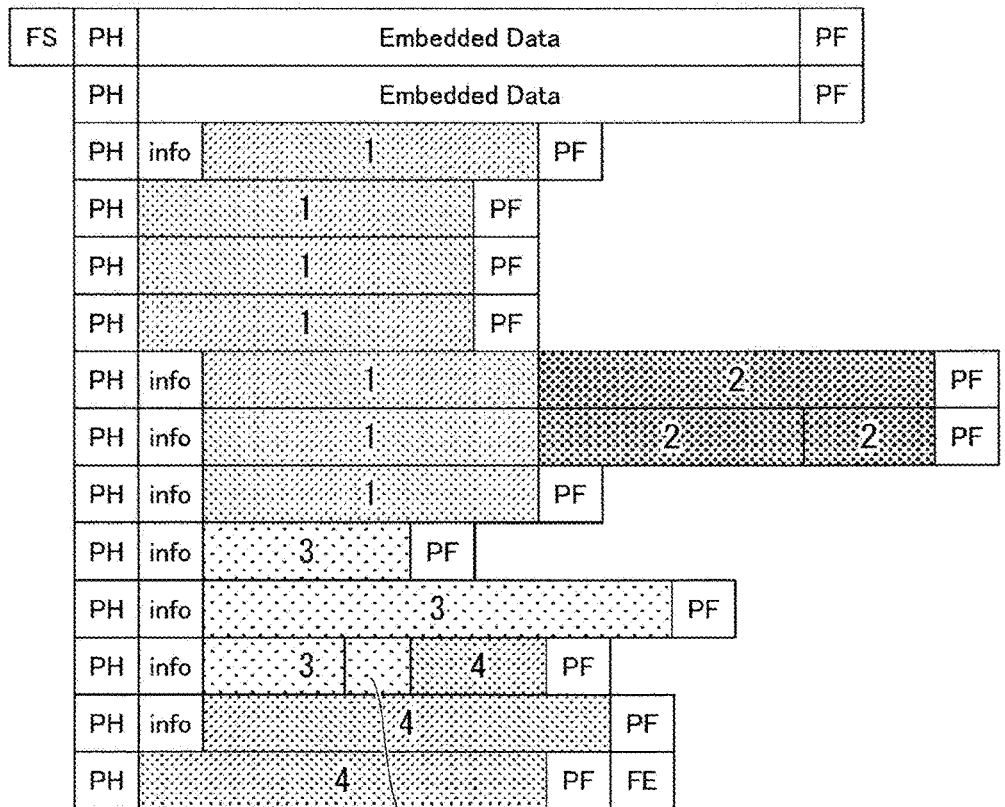
FIG. 12 is a diagram illustrating a configurational example of transmission data where the positional information of ROI images is included in the payload data of a long packet.

FIG. 12 is a diagram illustrating a configurational example of the transmission data 147A where the positional information of the ROI images 112a1 through 112a4 is included in the payload data of a long packet. As illustrated in FIG. 12, the transmission data 147A include a frame header area R1 and a packet area R2, for example. Incidentally, FIG. 12 illustrates details of the contents of the frame header area R1. Furthermore, low power modes LP are omitted from illustration in FIG. 12.

The frame header area R1 includes a frame number F1 as an identifier of the transmission data 147A, for example. The frame header area R1 includes information regarding compressed image data included in the packet area R2. The frame header area R1 includes, for example, the number of compressed image data (the number of ROIs) and information (ROI information) regarding each of the ROI images 112a1 through 112a4 corresponding to each compressed image data. The ROI information includes region numbers, physical region lengths, rectangular output region sizes, priority, exposure information, gain information, AD word lengths, and image formats. A physical region length represents the maximum length of a ROI image, and a rectangular output region size represents the size of a region of interest ROI.

"Info" illustrated in FIG. 12 represents region information stored in the payload of a long packet. The positional information of the ROI images 112a1 through 112a4 is stored in "info", for example. The positional information of the ROI images 112a1 through 112a4 is stored in the leading portions of the payloads of long packets. In a case where the physical region lengths in the X-axis direction of successive pixel rows making up ROI images are the same and each pixel row does not include a ROI image of a different region number, the region information "info" may not be stored in the payloads of long packets including image data of second and following ones of the pixel rows. According to the present example, in the ROI image 112a1, the physical region lengths in the X-axis direction of successive first through fourth ones of all the pixel rows are the same, and the first through fourth pixel rows do not include a ROI image of a different region number. Therefore, the region information "info" is not stored in the payloads of respective long packets including the image data of the second through fourth pixel rows that correspond to second and following ones of the successive first through fourth pixel rows making up the ROI image 112a1. According to the present example, furthermore, in the ROI image 112a4, the physical region lengths in the X-axis direction of successive second and third ones of all the pixel rows are the same, and the second and third pixel rows do not include a ROI image of a different region number. Therefore, the region information "info" is not stored in the payload of a long packet including the image data of the third pixel row that corresponds to second and following ones of the successive second and third pixel rows making up the ROI image 112a4. It is noted that, even in a case where the physical region lengths in the X-axis direction are the same and the respective pixel rows do not include a ROI image of a different region number, the region information "info" may be stored in the payload of each row.

The combining section 147 divides and places compressed image data generated by compressing the respective ROI images 112a1 through 112a4 per pixel row in the packet area R2 of the transmission data 147A, for example. "1" illustrated in FIG. 12 represents the compressed image data of the ROI image 112a1 stored in the payloads of long packets. "2" illustrated in FIG. 12 represents the compressed image data of the ROI image 112a2 stored in the payloads of long packets. "3" illustrated in FIG. 12 represents the compressed image data of the ROI image 112a3 stored in the payloads of long packets. "4" illustrated in FIG. 12 represents the compressed image data of the ROI image 112a4 stored in the payloads of long packets. In FIG. 12, the compressed image data are illustrated as being divided for an easy understanding. However, the data stored in the payloads of long packets are not divided. Compressed image data 112b corresponding to the image of the region of overlap ROO are not overlappingly included in the packet area R2 of the transmission data 147A. Furthermore, the combining section 147 has eliminated pixel rows that do not correspond to respective transmission images of the captured image 111 from the packet area R2 of the transmission data 147A. Consequently, pixel rows that do not correspond to respective transmission images of the captured image 111 are not included in the packet area R2 of the transmission data 147A.

Next, operation of the video receiving apparatus 200 in a case where it has received transmission data 147A will be described below.

The header separating section 211 of the receiving section 210 (see FIG. 8 for both) receives transmission data 147A from the video transmitting apparatus 100 via the data lane DL. Specifically, the header separating section 211 receives transmission data 147A including ROI information regarding the regions of interest ROI1 through ROI4 in the captured image 111 in the embedded data and also including image data (compressed image data) of the regions of interest ROI1 through ROI4 in the payload data of long packets. The header separating section 211 separates the received transmission data 147A into a frame header area R1 and a packet area R2.

The header interpreting section 212 (see FIG. 8) specifies the positions of the payload data of long packets included in the packet area R2 on the basis of data (specifically, embedded data) included in the frame header area R1.

The payload separating section 213 (see FIG. 8) separates the payload data of the long packets included in the packet area R2 from the packet area R2 on the basis of the positions of the payload data of the long packets that have been specified by the header interpreting section 212.

The EBD interpreting section 214 outputs the embedded data as EBD data to the information processing section 220 (see FIG. 8). Furthermore, the EBD interpreting section 214 discriminates whether the image data included in the payload data of the long packets are the compressed image data of the image data 116 of a ROI or the compressed image data of normal image data, from the data type included in the embedded data. The EBD interpreting section 214 outputs the discriminated result to the ROI data separating section 215 (see FIG. 8).

If image data where the image data included in the payload data of long packets represent a ROI are input, then the ROI data separating section 215 outputs the payload data of the long packets as payload data to the information processing section 220 (specifically, the ROI decoding section 222). The payload data of the long packets including ROI information include the ROI information and one line of pixel data of the compressed image data.

The information extracting section 221 (see FIG. 8) provided in the information processing section 220 extracts the number (four in the present example) of the regions of interest ROI1 through ROI4 included in the captured image 111, the region numbers 1 through 4 and the priorities 1 through 4 of the regions of interest ROI1 through ROI4, the data lengths of the respective regions of interest ROI1 through ROI4, and the image formats of the respective regions of interest ROI1 through ROI4 from the embedded data included in the EBD data input from the EBD interpreting section 214. Furthermore, the information extracting section 221 extracts the positional information of the ROI images 112a1 through 112a4 from the embedded data.

The ROI decoding section 222 decodes compressed image data 147B included in the payload data to extract the positional information of the ROI images 112a1 through 112a4 and generate image data (making up transmission images). In a case where payload data corresponding to a sixth pixel row, for example, are input, the ROI decoding section 222 extracts one piece of positional information of the ROI image 112a1 and two pieces of positional information of the ROI image 112a2 from the payload data, and generates respective image data (transmission images) of the ROI images 112a1 and 112b1 corresponding to the sixth pixel row.

In a case where payload data corresponding to a tenth pixel row, for example, are input, the ROI decoding section 222 extracts one piece of positional information of the ROI image 112a3 and one piece of positional information of the ROI image 112a4 from the payload data, and generates respective image data (transmission images) of the ROI images 112a3 and 112b4.

The ROI image generating section 223 (see FIG. 8) generates ROI images 112a1 through 112a4 of the regions of interest ROI1 through ROI4 in the captured image on the basis of the ROI information obtained by the information extracting section 221, the positional information of the ROI images 112a1 through 112a4 extracted by the ROI decoding section 222, and the transmission images generated by the ROI decoding section 222. In a case where the one piece of positional information of the ROI image 112a1 and two pieces of positional information of the ROI image 112a2, extracted from the payload data, corresponding to the sixth pixel row, for example, and their transmission images are input, the ROI image generating section 223 generates a ROI image 112a1 of five pixels extending in the X-axis direction, a ROI image 112a2 of four pixels extending in the X-axis direction at a position spaced five pixels from the ROI image 112a1, and a ROI image 112a2 of two pixels extending in the X-axis direction at a position spaced two pixels from the ROI image 112a2 (see FIG. 10).

Furthermore, the ROI image generating section 223 detects a region of overlap ROO where the region of interest ROI3 and the region of interest ROI4 overlap each other on the basis of the ROI information obtained by the information extracting section 221. The ROI image generating section 223 generates a ROI image 112a3 of four pixels extending in the X-axis direction and a ROI image 112a4 of three pixels extending in the X-axis direction with one pixel overlapping the ROI image 112a3 on the basis of the detected region of overlap ROO, the respective positional information of the ROI images 112a3 and 112a4, extracted from the payload, corresponding to the tenth pixel row, and the transmission images (see FIG. 10).

The ROI image generating section 223 outputs the generated images as ROI images to an apparatus at a subsequent stage (not illustrated).

In this manner, the video transmitting apparatus 100 and the video receiving apparatus 200 can send and receive images of objects as imaging targets as ROI images even if the objects are of a shape other than a rectangular shape.

3. Principles of a Demosaicing Process in Embodiments of the Present Disclosure Next, the principles of a demosaicing process in embodiments of the present disclosure will be described below with reference to FIGS. 13 through 18.

Figure 13:
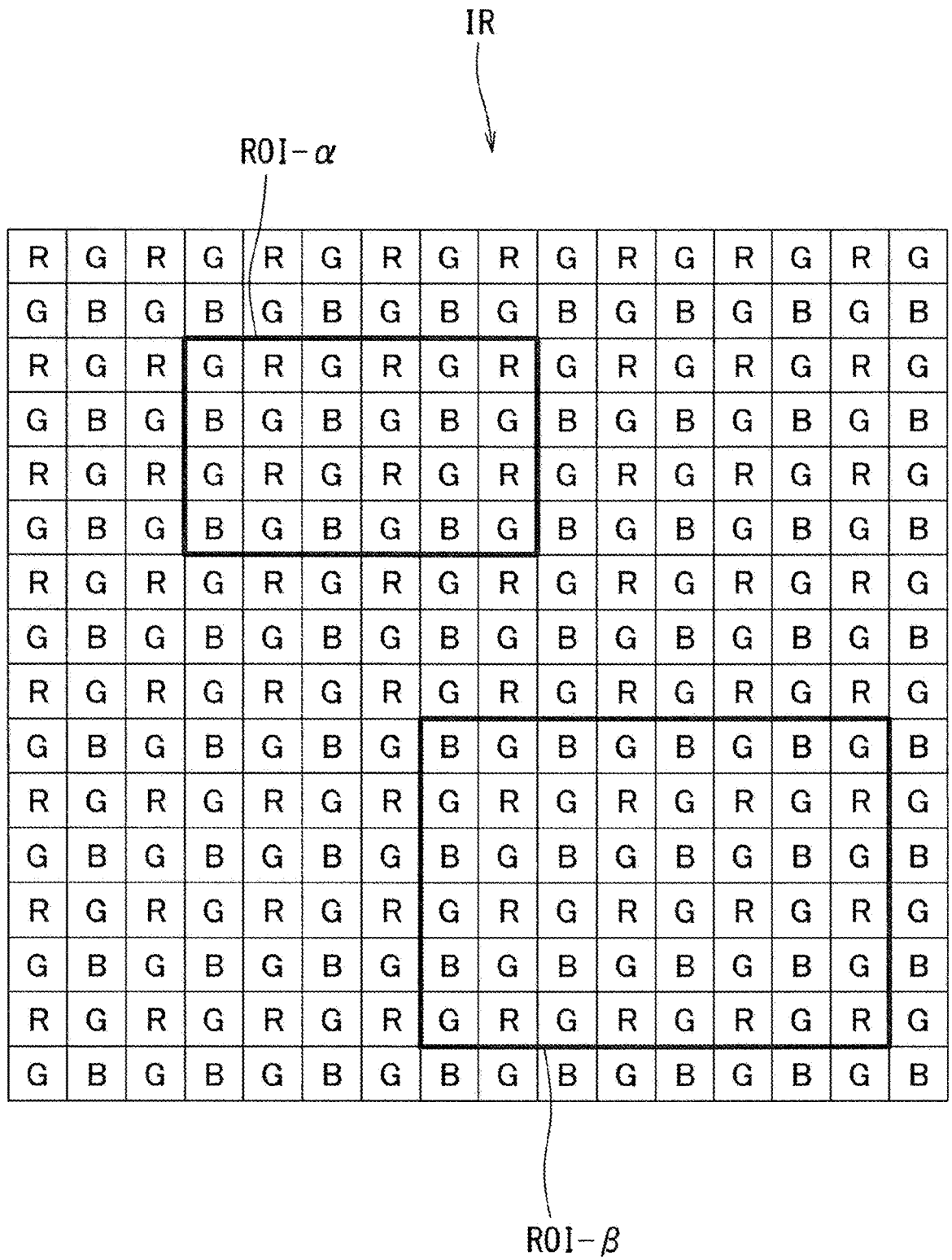
FIG. 13 is a diagram schematically illustrating an example of a color array of image capturing elements disposed in an image capturing region of an image capturing section.
Figure 18:
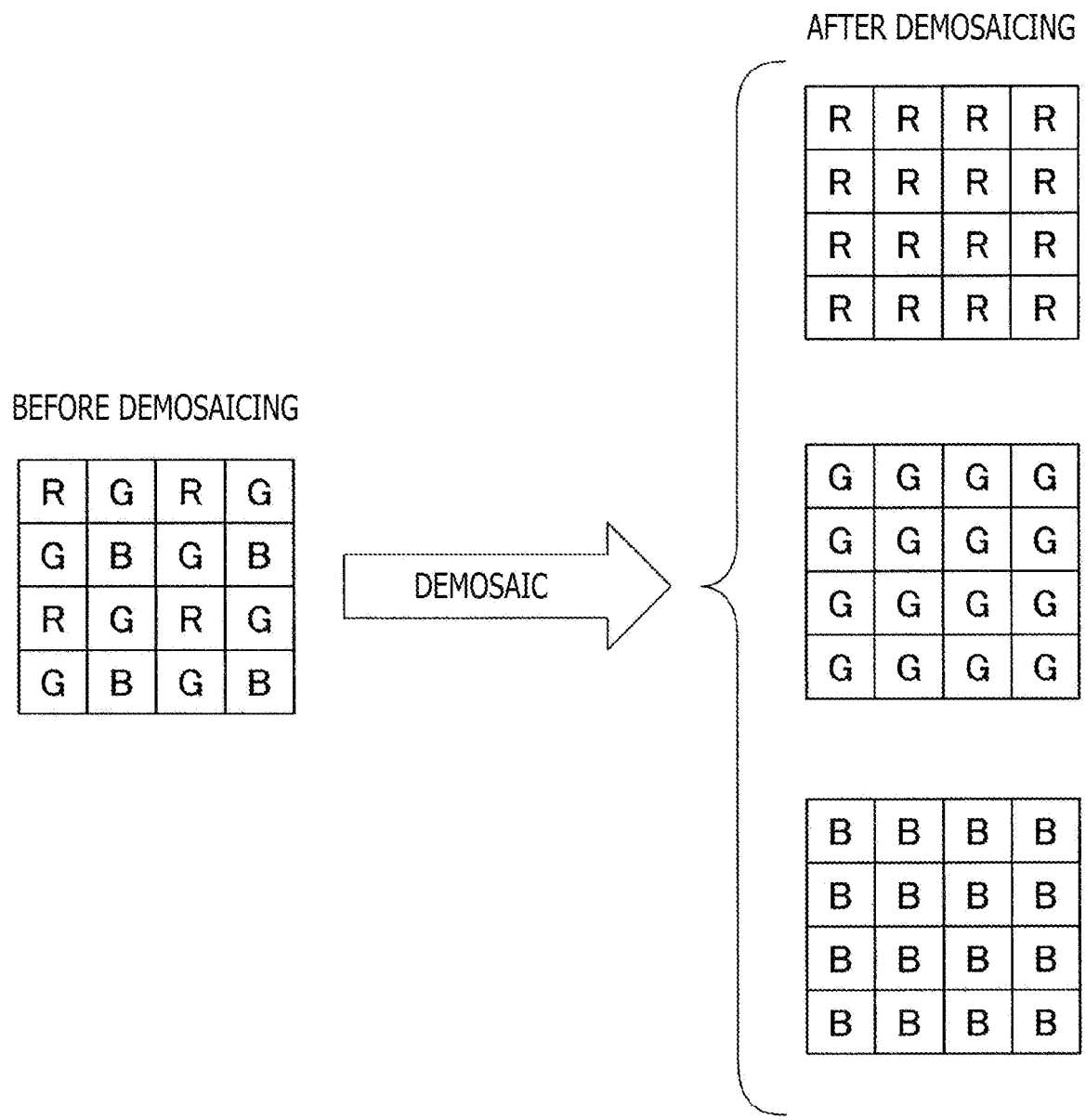
FIG. 18 is a diagram schematically illustrating a demosaicing process.

FIG. 13 is a diagram schematically illustrating an example of a color array of image capturing elements disposed in an image capturing region of an image capturing section. FIG. 14A is a diagram schematically illustrating an array example A of a color array of image capturing elements disposed in an image capturing region of an image capturing section. FIG. 14B is a diagram illustrating array patterns of color arrays of image capturing elements segmented from the image capturing region illustrated in FIG. 14A. FIG. 15A is a diagram schematically illustrating an array example B of a color array of image capturing elements disposed in an image capturing region of an image capturing section. FIG. 15B is a diagram illustrating array patterns of color arrays of image capturing elements segmented from the image capturing region illustrated in FIG. 15A. FIG. 16A is a diagram schematically illustrating an array example C of a color array of image capturing elements disposed in an image capturing region of an image capturing section. FIG. 16B is a diagram illustrating array patterns of color arrays of image capturing elements segmented from the image capturing region illustrated in FIG. 16A. FIG. 17A is a diagram schematically illustrating an array example D of a color array of image capturing elements disposed in an image capturing region of an image capturing section. FIG. 17B is a diagram illustrating array patterns PD1 through PD4 of color arrays of image capturing elements segmented from the image capturing region illustrated in FIG. 17A. FIG. 18 is a diagram schematically illustrating a demosaicing process.

As illustrated in FIG. 13, an image capturing region IR according to the present example has a red pixel (hereinafter referred to as "R pixel") disposed at a left upper end. Furthermore, the image capturing region IR has odd-numbered rows where an R pixel is located at a left end and R pixels and green pixels (hereinafter referred to as "G pixel") are alternately disposed, and even-numbered rows where a G pixel is located at a left end and G pixels and blue pixels (hereinafter referred to as "B pixel") are alternately disposed.

As illustrated in FIG. 13, a color array of pixels disposed in the image capturing region IR of the image capturing section is fixedly established. Therefore, an ordinary demosaicing process for demosaicing the image capturing region IR in its entirety can be performed if the video receiving apparatus has the information of a color array of the image capturing region IR in its entirety.

However, regions of interest ROI that are segmented have indefinite scopes and sizes. Thus, as illustrated in FIG. 13, a region of interest ROI-α has a G pixel at a left upper end thereof, and a region of interest ROI-β has a B pixel at a left upper end thereof. Consequently, even if the video receiving apparatus has the information of a color array of the image capturing region IR in its entirety, it performs a demosaicing process on the region of interest ROI-α and the region of interest ROI-β where their left upper ends are regarded as having an R pixel. Therefore, the demosaiced image is different from the original image. Thus, the demosaicing process cannot be performed on ROIs whose positions and sizes are optionally selected in the image capturing region IR.

According to the present embodiment, consequently, the video transmitting apparatus acquires demosaicing information for use in a demosaicing process for image data of ROIs and transmits the acquired demosaicing information to the video receiving apparatus. The video receiving apparatus performs a demosaicing process using the demosaicing information transmitted from the video transmitting apparatus.

As illustrated in FIG. 14A, the array example A of a color array of image capturing elements has the same color array as the image capturing region IR illustrated in FIG. 13. As illustrated in FIG. 14B, there are four array patterns PA1 through PA4 as color arrays segmented from the array example A. As illustrated in FIG. 14B, a left upper end of the array pattern PA1 corresponds to an R pixel of an odd-numbered row (H) and an odd-numbered column (V). The color array of the image capturing region in its entirety of the array example A is known (see FIG. 14A). Therefore, providing the segmented region has a size represented by 3 rows and 3 columns, as illustrated in FIG. 14B, it is fixedly established that the array pattern PA1 has a first row of "R pixel, G pixel, R pixel," a second row of "G pixel, B pixel, G pixel," and a third row of "R pixel, G pixel, R pixel."

As illustrated in FIG. 14B, a left upper end of the array pattern PA2 corresponds to a G pixel of an even-numbered row (H) and an odd-numbered column (V). The color array of the image capturing region in its entirety of the array example A is known (see FIG. 14A). Therefore, providing the segmented region has a size represented by 3 rows and 3 columns, as illustrated in FIG. 14B, it is fixedly established that the array pattern PA2 has a first row of "G pixel, R pixel, G pixel," a second row of "B pixel, G pixel, B pixel," and a third row of "G pixel, R pixel, G pixel."

As illustrated in FIG. 14B, a left upper end of the array pattern PA3 corresponds to a G pixel of an odd-numbered row (H) and an even-numbered column (V). The color array of the image capturing region in its entirety of the array example A is known (see FIG. 14A). Therefore, providing the segmented region has a size represented by 3 rows and 3 columns, as illustrated in FIG. 14B, it is fixedly established that the array pattern PA3 has a first row of "G pixel, B pixel, G pixel," a second row of "R pixel, G pixel, R pixel," and a third row of "G pixel, B pixel, G pixel."

As illustrated in FIG. 14B, a left upper end of the array pattern PA4 corresponds to a B pixel of an even-numbered row (H) and an even-numbered column (V). The color array of the image capturing region in its entirety of the array example A is known (see FIG. 14A). Therefore, providing the segmented region has a size represented by 3 rows and 3 columns, as illustrated in FIG. 14B, it is fixedly established that the array pattern PA4 has a first row of "B pixel, G pixel, B pixel," a second row of "G pixel, R pixel, G pixel," and a third row of "B pixel, G pixel, B pixel."

As illustrated in FIG. 15A, the array example B of a color array of image capturing elements has a G pixel disposed at a left upper end thereof. Furthermore, the array example B has odd-numbered rows where a G pixel is located at a left end and G pixels and R pixels are alternately disposed, and even-numbered rows where a B pixel is located at a left end and B pixels and G pixels are alternately disposed.

As illustrated in FIG. 15B, there are four array patterns PB1 through PB4 as color arrays segmented from the array example B. As illustrated in FIG. 15B, a left upper end of the array pattern PB1 corresponds to a G pixel of an odd-numbered row (H) and an odd-numbered column (V). The color array of the image capturing region in its entirety of the array example B is known (see FIG. 15A). Therefore, providing the segmented region has a size represented by 3 rows and 3 columns, as illustrated in FIG. 15B, it is fixedly established that the array pattern PB1 has a first row of "G pixel, R pixel, G pixel," a second row of "B pixel, G pixel, B pixel," and a third row of "G pixel, R pixel, G pixel."

As illustrated in FIG. 15B, a left upper end of the array pattern PB2 corresponds to an R pixel of an even-numbered row (H) and an odd-numbered column (V). The color array of the image capturing region in its entirety of the array example B is known (see FIG. 15A). Therefore, providing the segmented region has a size represented by 3 rows and 3 columns, as illustrated in FIG. 15B, it is fixedly established that the array pattern PB2 has a first row of "R pixel, G pixel, R pixel," a second row of "G pixel, B pixel, G pixel," and a third row of "R pixel, G pixel, R pixel."

As illustrated in FIG. 15B, a left upper end of the array pattern PB3 corresponds to a B pixel of an odd-numbered row (H) and an even-numbered column (V). The color array of the image capturing region in its entirety of the array example B is known (see FIG. 15A). Therefore, providing the segmented region has a size represented by 3 rows and 3 columns, as illustrated in FIG. 15B, it is fixedly established that the array pattern PB3 has a first row of "B pixel, G pixel, B pixel," a second row of "G pixel, R pixel, G pixel," and a third row of "B pixel, G pixel, B pixel."

As illustrated in FIG. 15B, a left upper end of the array pattern PB4 corresponds to a G pixel of an even-numbered row (H) and an even-numbered column (V). The color array of the image capturing region in its entirety of the array example B is known (see FIG. 15A). Therefore, providing the segmented region has a size represented by 3 rows and 3 columns, as illustrated in FIG. 15B, it is fixedly established that the array pattern PB4 has a first row of "G pixel, B pixel, G pixel," a second row of "R pixel, G pixel, R pixel," and a third row of "G pixel, B pixel, G pixel."

As illustrated in FIG. 16A, the array example C of a color array of image capturing elements has a B pixel disposed at a left upper end thereof. Furthermore, the array example C has odd-numbered rows where a B pixel is located at a left end and B pixels and G pixels are alternately disposed, and even-numbered rows where a G pixel is located at a left end and G pixels and R pixels are alternately disposed.

As illustrated in FIG. 16B, there are four array patterns PC1 through PC4 as color arrays segmented from the array example C. As illustrated in FIG. 16B, a left upper end of the array pattern PC1 corresponds to a B pixel of an odd-numbered row (H) and an odd-numbered column (V). The color array of the image capturing region in its entirety of the array example C is known (see FIG. 16A). Therefore, providing the segmented region has a size represented by 3 rows and 3 columns, as illustrated in FIG. 16B, it is fixedly established that the array pattern PC1 has a first row of "B pixel, G pixel, B pixel," a second row of "G pixel, R pixel, G pixel," and a third row of "B pixel, G pixel, B pixel."

As illustrated in FIG. 16B, a left upper end of the array pattern PC2 corresponds to a G pixel of an even-numbered row (H) and an odd-numbered column (V). The color array of the image capturing region in its entirety of the array example C is known (see FIG. 16A). Therefore, providing the segmented region has a size represented by 3 rows and 3 columns, as illustrated in FIG. 16B, it is fixedly established that the array pattern PC2 has a first row of "G pixel, B pixel, G pixel," a second row of "R pixel, G pixel, R pixel," and a third row of "G pixel, B pixel, G pixel."

As illustrated in FIG. 16B, a left upper end of the array pattern PC3 corresponds to a G pixel of an odd-numbered row (H) and an even-numbered column (V). The color array of the image capturing region in its entirety of the array example C is known (see FIG. 16A). Therefore, providing the segmented region has a size represented by 3 rows and 3 columns, as illustrated in FIG. 16B, it is fixedly established that the array pattern PC3 has a first row of "G pixel, R pixel, G pixel," a second row of "B pixel, G pixel, B pixel," and a third row of "G pixel, R pixel, G pixel."

As illustrated in FIG. 16B, a left upper end of the array pattern PC4 corresponds to an R pixel of an even-numbered row (H) and an even-numbered column (V). The color array of the image capturing region in its entirety of the array example C is known (see FIG. 16A). Therefore, providing the segmented region has a size represented by 3 rows and 3 columns, as illustrated in FIG. 16B, it is fixedly established that the array pattern PC3 has a first row of "R pixel, G pixel, R pixel," a second row of "G pixel, B pixel, G pixel," and a third row of "R pixel, G pixel, R pixel."

As illustrated in FIG. 17A, the array example D of a color array of image capturing elements has an R pixel disposed at a left upper end thereof. Furthermore, the array example D has odd-numbered rows where an R pixel is located at a left end and R pixels and G pixels are alternately disposed, and even-numbered rows where a white pixel (hereinafter referred to as "W pixel") is located at a left end and W pixels and B pixels are alternately disposed. A W pixel represents a pixel having no color element (color filter) on a photoelectric transducer (for example, a photodiode), for example.

As illustrated in FIG. 17B, there are four array patterns PD1 through PD4 as color arrays segmented from the array example D. As illustrated in FIG. 17B, a left upper end of the array pattern PD1 corresponds to an R pixel of an odd-numbered row (H) and an odd-numbered column (V). The color array of the image capturing region in its entirety of the array example D is known (see FIG. 17A). Therefore, providing the segmented region has a size represented by 3 rows and 3 columns, as illustrated in FIG. 17B, it is fixedly established that the array pattern PD1 has a first row of "R pixel, G pixel, R pixel," a second row of "W pixel, B pixel, W pixel," and a third row of "R pixel, G pixel, R pixel."

As illustrated in FIG. 17B, a left upper end of the array pattern PD2 corresponds to a G pixel of an even-numbered row (H) and an odd-numbered column (V). The color array of the image capturing region in its entirety of the array example D is known (see FIG. 17A). Therefore, providing the segmented region has a size represented by 3 rows and 3 columns, as illustrated in FIG. 17B, it is fixedly established that the array pattern PD2 has a first row of "G pixel, R pixel, G pixel," a second row of "B pixel, W pixel, B pixel," and a third row of "G pixel, R pixel, G pixel."

As illustrated in FIG. 17B, a left upper end of the array pattern PD3 corresponds to a W pixel of an odd-numbered row (H) and an even-numbered column (V). The color array of the image capturing region in its entirety of the array example D is known (see FIG. 17A). Therefore, providing the segmented region has a size represented by 3 rows and 3 columns, as illustrated in FIG. 17B, it is fixedly established that the array pattern PD3 has a first row of "W pixel, B pixel, W pixel," a second row of "R pixel, G pixel, R pixel," and a third row of "W pixel, B pixel, W pixel."

As illustrated in FIG. 17B, a left upper end of the array pattern PD4 corresponds to a W pixel of an even-numbered row (H) and an even-numbered column (V). The color array of the image capturing region in its entirety of the array example D is known (see FIG. 17A). Therefore, providing the segmented region has a size represented by 3 rows and 3 columns, as illustrated in FIG. 17B, it is fixedly established that the array pattern PD4 has a first row of "B pixel, W pixel, B pixel," a second row of "G pixel, R pixel, G pixel," and a third row of "B pixel, W pixel, B pixel."

In this manner, in a case where the color array of the image capturing region in its entirety is known, the color array of pixels included in a region of interest ROI can be fixedly established by obtaining information as to which color the pixel at the left upper end is, information as to whether each of the row and column of the left upper end is odd-numbered or even-numbered, and information as to the size of the segmented region. Therefore, when the video transmitting apparatus transmits the information regarding the color array of pixels per region of interest ROI as demosaicing information to the video receiving apparatus, the video receiving apparatus can perform a demosaicing process on regions of interest ROI.

For example, it is assumed that each of the video transmitting apparatus and the video receiving apparatus stores in the storage section information indicating that the image capturing section has the image capturing region having the color array of the array example A, and the information of the left upper end of the array pattern PA1 and the information of the size of a region of interest ROI-y are transmitted as demosaicing information from the video transmitting apparatus to the video receiving apparatus. The video receiving apparatus can determine that the region of interest ROI-γ has a color array illustrated on the left side of FIG. 18 on the basis of the demosaicing information. The video receiving apparatus performs a demosaicing process for converting RGB values on the mosaic into RGB signals per pixel on the basis of the determined color array of the region of interest ROI-γ. The video receiving apparatus generates pixels that are not present before mosaicing from peripheral pixels of identical colors by way of interpolation or the like. The video receiving apparatus performs an interpolating process on pixels on the basis of the color array in the region of interest ROI-y to generate red pixel data, green pixel data, and blue pixel data after demosaicing, as indicated on the right side of the thick arrow in FIG. 18.

4. A First Embodiment of the Present Disclosure

Figure 19:
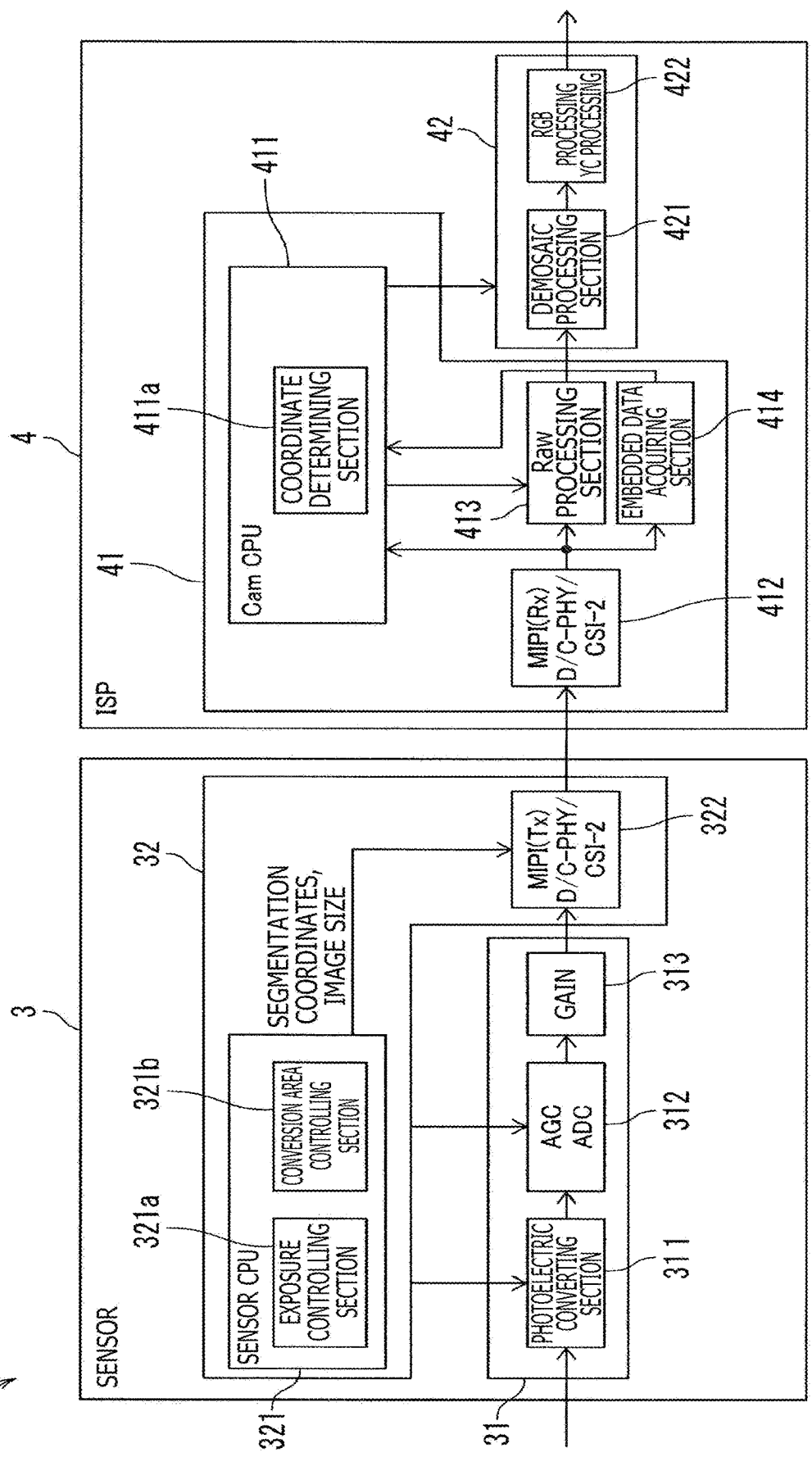
FIG. 19 is a block diagram illustrating a general makeup of a transmitting apparatus, a receiving apparatus, and a transmission system according to a first embodiment.

Next, a transmitting apparatus, a receiving apparatus, and a transmission system according to a first embodiment of the present disclosure will be described below with reference to FIGS. 19 through 22. First, a general makeup of the transmitting apparatus, the receiving apparatus, and the transmission system according to the present embodiment will be described below with reference to FIG. 19. FIG. 19 is a block diagram illustrating a general makeup of a video transmitting apparatus 3, a video receiving apparatus 4, and a video transmission system 10 according to the present embodiment.

As illustrated in FIG. 19, the video transmission system 10 according to the present embodiment includes the video transmitting apparatus (an example of the transmitting apparatus) 3 that functions as an image sensor and the video receiving apparatus (an example of the receiving apparatus) 4 that functions as an image signal processor (ISP). In the video transmission system (an example of transmission system) 10, the video transmitting apparatus 3 is configured to have a transmitting section 322 send out signals according to the MIPI (Mobile Industry Processor Interface) D-PHY standards, the MIPI C-PHY standards, or the MIPI CSI (Camera Serial Interface)-2 standards. In the video transmission system 10, furthermore, the video receiving apparatus 4 is configured to have a receiving section 412 receive signals according to the MIPI D-PHY standards, the MIPI C-PHY standards, or the MIPI CSI-2 standards. Moreover, the video transmission system 10 may be configured to send and receive signals according to the MPIP CSI-3 standards or the MIPI DSI standards between the video transmitting apparatus 3 and the video receiving apparatus 4, as with the video transmission system 1 according to the presupposed technologies 1 and The video transmitting apparatus 3 provided in the video transmission system 10 is configured to perform functions equivalent to those of the video transmitting apparatus 100 according to the presupposed technologies 1 and 2. Specifically, the video transmitting apparatus 3 is configured to perform the same process as the video transmitting apparatus 100 on captured images input from an image capturing section 31 in a case where a control signal indicating the segmentation of ROIs is input from the video receiving apparatus 4. Furthermore, the video transmitting apparatus 3 is configured to perform the same process as the video transmitting apparatus 100 on captured images input from the image capturing section 31 in a case where a control signal indicating the outputting of a normal image is input from the video receiving apparatus 4. Moreover, the video transmitting apparatus 3 is configured to acquire demosaicing information for use in the above demosaicing process and send out the demosaicing information to the video receiving apparatus 4.

The video receiving apparatus 4 is configured to perform functions equivalent to those of the video receiving apparatus 200 according to the presupposed technologies 1 and 2. Specifically, the video receiving apparatus 4 is configured to perform the same process as the video receiving apparatus 200 according to the presupposed technologies 1 and 2 on transmission data transmitted from the video transmitting apparatus 3. Furthermore, the video receiving apparatus 4 is configured to perform a demosaicing process using demosaicing information transmitted from the video transmitting apparatus 3.

Therefore, FIG. 19 illustrates the video transmitting apparatus 3 and the video receiving apparatus 4 mainly with respect to configurational details regarding the demosaicing process.

As illustrated in FIG. 19, the video transmitting apparatus 3 includes the image capturing section 31 that captures images of targets. The image capturing section 31 has a photoelectric converting section 311 for converting incident light into electric signals, for example. The photoelectric converting section 311 includes, for example, a CCD image sensor or a CMOS image sensor. Furthermore, the image capturing section 31 has a signal converting section 312 for converting an analog electric signal input from the photoelectric converting section 311 into digital image data. The signal converting section 312 is configured to perform a signal amplifying (AGC) process for amplifying the analog electric signal input from the photoelectric converting section 311 and an analog-to-digital converting (ADC) process for converting the amplified signal into a digital signal. The image capturing section 31 has an amplifying section 313 for applying a digital gain to image data input from the signal converting section 312. The amplifying section 313 outputs the image data with the digital gain applied thereto to the transmitting section 322.

The video transmitting apparatus 3 includes a controlling section 32 for controlling the image capturing section 31 and controlling predetermined signal processing processes. The controlling section 32 has a sensor CPU 321 and the transmitting section 322. The sensor CPU 321 is configured to perform the same functions as the image processing sections 120 and 130 (see FIG. 2). The transmitting section 320 is configured to perform the same functions as the transmitting section 140 (see FIG. 2). In the controlling section 32, the sensor CPU 321 may be replaced with image processing sections 120 and 130, and the transmitting section 322 may be replaced with the transmitting section 140.

The sensor CPU 321 has an exposure controlling section 321a for controlling exposure conditions of the photoelectric converting section 311. Furthermore, the sensor CPU 321 has a conversion area controlling section (an example of a controlling section) 321b for controlling the acquisition of demosaicing information for use in a demosaicing process for image data of ROIs. Each of the sensor CPU 321 having the conversion area controlling section 321b and the controlling section 32 corresponds to an example of a controlling section for controlling the acquisition of demosaicing information for use in a demosaicing process for image data of regions of interest ROI.

The conversion area controlling section 321b is configured to acquire demosaicing information of regions of interest ROI. In a case where a plurality of regions of interest ROI is established, the conversion area controlling section 321b is configured to acquire demosaicing information of each of the regions of interest ROI. The conversion area controlling section 321b is configured to acquire, as demosaicing information, color arrays of image data of regions of interest ROI or color information of ends of image data of regions of interest ROI. More specifically, the conversion area controlling section 321b acquire, as demosaicing information, color information of ends of regions of interest ROI and information indicating which one of combinations of an odd-numbered row and an even-numbered row and an odd-numbered column and an even-numbered column the ends represent, as information of color arrays. According to the present embodiment, color information of a left upper end as an end of a region of interest ROI is acquired. However, information of either one of ends of four corners or information of any other locations may be used insofar as it can specify a color array of a region of interest ROI. The conversion area controlling section 321b acquires color information of a pixel at a left upper end, for example, of a region of interest ROI and even-numbered or odd-numbered row information and column information of the left upper end, and outputs the acquired information to the transmitting section 322.

Furthermore, the conversion area controlling section 321b is configured to send out information of the color array of the image capturing region in its entirety of the image capturing section 31 to the video receiving apparatus 4 when first demosaicing information is sent out after the video transmitting apparatus 3 and the video receiving apparatus 4 have been activated or each time demosaicing process information is sent out.

Even if an object to be segmented is not of a rectangular shape, the sensor CPU 321 establishes a minimum rectangular shape including the object as a region of interest ROI, as is the case with the ROI segmenting section 121 (see FIG. 2). Moreover, the sensor CPU 321 derives positional information (the left upper end, the length in the X-axis direction, and the length in the Y-axis direction) of a region of interest ROI and sends out the derived positional information to the video receiving apparatus 4, as is the case with the ROI analyzing section 122 (see FIG. 2).

The video receiving apparatus 4 can recognize the color array of a region of interest ROI in its entirety on the basis of the information of the overall size of the region of interest ROI, the demosaicing information of the left upper end of the region of interest ROI, and the information of the color array of the image capturing region in its entirety. In this manner, even if an object to be segmented is not of a rectangular shape, the video receiving apparatus 4 can interpolate pixels that are not present before mosaicing from peripheral pixels of identical colors in the demosaicing process.

The transmitting section 322 generates transmission data (see FIGS. 6 and 12) including coordinates (segmenting coordinates), size, and demosaicing information of the region of interest ROI input from the sensor CPU 321, and also including image data input from the image capturing section 31, and sends out the generated transmission data to the video receiving apparatus 4. The demosaicing information is included in ROI information and sent out from the transmitting section 322. As the ROI information is included in embedded data, the demosaicing information is included in the embedded data and sent out from the transmitting section 322.

In this fashion, the video transmitting apparatus 3 sends out the demosaicing information included in the ROI information from the transmitting section 322. Stated otherwise, the video transmitting apparatus 3 sends out the color array of the image data of the region of interest ROI or the color information of the end of the image data of the region of interest ROI as the demosaicing information from the transmitting section 322. Further stated otherwise, the video transmitting apparatus 3 sends out the color information of the end (left upper end in the present embodiment) of the region of interest ROI and the information indicating which one of combinations of an odd-numbered row and an even-numbered row and an odd-numbered column and an even-numbered column the end represents, as the demosaicing information from the transmitting section 322.

As illustrated in FIG. 19, the video transmitting apparatus 3 includes the transmitting section 322 that sends out image data of regions of interest ROI as the payload data of long packets and ROI information as embedded data. The transmitting section 322 includes demosaicing information as one piece of the ROI information in the embedded data and sends out the demosaicing information to the video receiving apparatus 4. The transmitting section 322 is configured to send out transmission data including the demosaicing information according to the MIPI D-PHY standards, the MIPI C-PHY standards, or the MIPI CSI-2 standards.

As illustrated in FIG. 19, the video receiving apparatus 4 includes a controlling section 41 for controlling a predetermined signal processing process using transmission data transmitted from the video transmitting apparatus 3. The controlling section 41 has a Cam CPU 411, a receiving section 412, a Raw processing section 413, and an embedded data acquiring section 414. The Cam CPU 411 is configured to perform the same functions as the information processing section 220 (see FIG. 8), except for the information extracting section 221 and the ROI image generating section 223 (see FIG. 8). In the video receiving apparatus 4, the Raw processing section 413 is configured to perform the same functions as the ROI image generating section 223. The receiving section 412 is configured to perform the same functions as the receiving section 210 (see FIG. 8), except for the EBD interpreting section 214 (see FIG. 8). In the video receiving apparatus 4, the embedded data acquiring section 414 is configured to perform the same functions as the EBD interpreting section 214 and the information extracting section 221. In the controlling section 41, the receiving section 412 and the embedded data acquiring section 414 may be replaced with the receiving section 210, and the Cam CPU 411 and the Raw processing section 413 may be replaced with the information processing section 220. In this case, the functions of the information extracting section 221 that are performed by the embedded data acquiring section 414 are performed by the receiving section 220.

As illustrated in FIG. 19, the video receiving apparatus 4 includes the receiving section 412 that receives a transmission signal where image data of regions of interest ROI are included in the payload data and ROI information are included in the embedded data. The receiving section 412 is configured to receive transmission data input from the video transmitting apparatus 3. The receiving section 412 receives the transmission data according to the MIPI D-PHY standards, the MIPI C-PHY standards, or the MIPI CSI-2 standards. The receiving section 412 generates various kinds of data from the input transmission data and outputs the generated data to the Cam CPU 411, the Raw processing section 413, and the embedded data acquiring section 414.

The Raw processing section 413 is configured to generate image data of regions of interest ROI based on information (ROI information, image data included in the payload data, etc.) regarding the regions of interest ROI input from the Cam CPU 411. The image data generated by the Raw processing section 413 include unprocessed image data acquired by photoelectric converting section 311, called Raw data, Raw image, or undeveloped data. The Raw processing section 413 is configured to output the generated image data to an image processing section 42 (to be described in detail later).

As illustrated in FIG. 19, the video receiving apparatus 4 includes the embedded data acquiring section (an example of a controlling section) 414 that controls the extraction of demosaicing information for use in a demosaicing process for image data of regions of interest ROI from the transmission signal (transmission data) received by the receiving section 412. The controlling section 41 that has the embedded data acquiring section 414 corresponds to an example of a controlling section that controls the extraction of demosaicing information for use in a demosaicing process for image data of regions of interest ROI from the transmission signal (transmission data) received by the receiving section 412. The embedded data acquiring section 414 is configured to extract demosaicing information from ROI information included in the transmission signal (transmission data) input from the receiving section 412. Since the ROI information is included in the embedded data, the embedded data acquiring section 414 extracts demosaicing information from the embedded data included in the transmission signal (transmission data) input from the receiving section 412. The embedded data acquiring section 414 is configured to extract color arrays of the image data of regions of interest ROI or color information of ends of the image data of regions of interest ROI as demosaicing information. More specifically, the embedded data acquiring section 414 is configured to extract, as demosaicing information, color information of ends of regions of interest ROI and information indicating which one of combinations of an odd-numbered row and an even-numbered row and an odd-numbered column and an even-numbered column the ends represent, as information of color arrays. According to the present embodiment, the embedded data acquiring section 414 is configured to acquire color information of a left upper end as an end of a region of interest ROI. However, information of either one of ends of four corners or information of any other locations may be used insofar as it can specify a color array of a region of interest ROI. The embedded data acquiring section 414 acquires color information of a pixel at a left upper end, for example, of a region of interest ROI and even-numbered or odd-numbered row information and column information of the left upper end, and outputs the acquired information to the Cam CPU 411.

The embedded data acquiring section 414 acquires, other than the demosaicing information, various pieces of information (for example, the number of regions of interest ROI, the region numbers and priority of the regions of interest ROI, the data lengths of the regions of interest ROI, the image format of the regions of interest ROI, etc.) included in the embedded data. The embedded data acquiring section 414 outputs the acquired various pieces of information to the Cam CPU 411.

As illustrated in FIG. 19, the Cam CPU 411 has a coordinate determining section 411a. The coordinate determining section 411a is configured to determine coordinates (positions and sizes) and color arrays of the regions of interest ROI on the basis of the various pieces of information input from the embedded data acquiring section 414. In a case where information regarding a plurality of regions of interest ROI is input from the embedded data acquiring section 414, the coordinate determining section 411*a* determines coordinates and a color array per region of interest ROI. The coordinate determining section 411*a* establishes the coordinates of a left upper end of a region of interest ROI to be demosaiced on the basis of the determined coordinates of the left upper end of the region of interest ROI.

The Cam CPU 411 outputs information regarding the coordinates and color arrays of the regions of interest ROI that have been determined by the coordinate determining section 411*a* and information regarding the region numbers and priority of the regions of interest ROI that have been input from the embedded data acquiring section 414, to the image processing section 42.

As illustrated in FIG. 19, the video receiving apparatus 4 includes the image processing section 42. The image processing section 42 has a demosaic processing section 421 for performing a demosaicing process on the image data of regions of interest ROI using the demosaicing information extracted by the embedded data acquiring section 414. The image processing section 42 also has an image quality adjusting section 422 for adjusting the image quality of the image data that have been demosaiced.

The demosaic processing section 421 is configured to perform a demosaicing process on image data input from the Raw processing section 413 on the basis of the demosaicing information (the information of the coordinates and color arrays of regions of interest ROI) extracted by the embedded data acquiring section 414 and input via the Cam CPU 411. As described with reference to FIGS. 14 through 18, the demosaic processing section 421 performs a demosaicing process on image data before demosaicing (corresponding to the image data input from the Raw processing section 413), as indicated on the left side of the thick arrow in FIG. 18, on the basis of the array pattern PA1 illustrated in FIG. 14B, for example. In this manner, the demosaic processing section 421 generates image data after demosaicing, as indicated on the right side of the thick arrow in FIG. 18.

Furthermore, the demosaic processing section 421 is configured to perform a boundary process on image data disposed at peripheral ends in regions of interest ROI. Specifically, the demosaic processing section 421 performs a boundary process on image data disposed on profile portions (edge portions) of regions of interest ROI. The demosaic processing section 421 performs a boundary process on the image data of a first row in a region of interest ROI, using the image data of a second row in the region of interest ROI. Furthermore, the demosaic processing section 421 performs a boundary process on the image data of a final row in a region of interest ROI, using the image data of a row preceding the final row in the region of interest ROI. Therefore, the demosaic processing section 421 performs a process equivalent to a boundary process that would be performed on the image data included in the payload data of a first pixel row included in the packet area of the transmission data, using the image data included in the payload data of a second pixel row included in the packet area. Furthermore, the demosaic processing section 421 performs a process equivalent to a boundary process that would be performed on the image data included in the payload data of a final pixel row included in the packet area of the transmission data, using the image data included in the payload data of a row preceding the final pixel row included in the packet area.

The demosaic processing section 421 is configured to output the image data that has been demosaiced to the image quality adjusting section 422.

The image quality adjusting section 422 is configured to adjust image quality by performing an RGB process for adjusting gamma correction and white balance and a YC process for adjusting the gradation and lightness of the image quality on the image data input from the demosaic processing section 421. The image quality adjusting section 422 is configured to output an image whose image quality has been adjusted to a display device (not illustrated), for example. The image as desired is thus displayed on the display device.

(Demosaic Processing Method)

Figure 20:
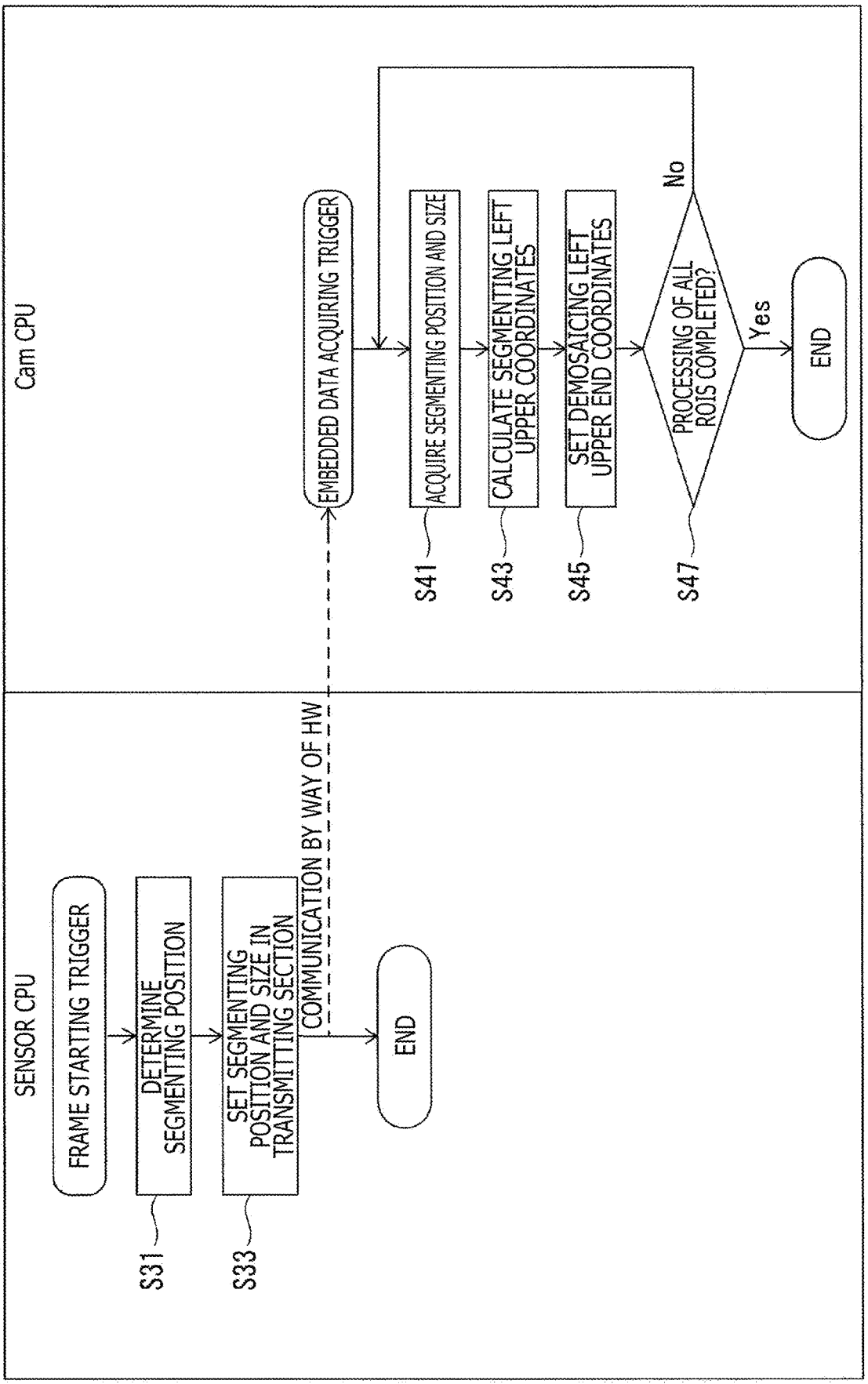
FIG. 20 is a flowchart illustrating a sequence of a demosaicing process in the transmitting apparatus, the receiving apparatus, and the transmission system according to the first embodiment.

Next, a demosaic processing method in the transmitting apparatus, the receiving apparatus, and the transmission system according to the present embodiment will be described below using FIGS. 20 and 21 with reference to FIG. 19. First, a sequence of a demosaicing process in the transmitting apparatus, the receiving apparatus, and the transmission system according to the present embodiment will be described below. FIG. 20 is a flowchart illustrating a sequence of a demosaicing process in the transmitting apparatus, the receiving apparatus, and the transmission system according to the present embodiment.

(Step S31)

As illustrated in FIG. 20, when the sensor CPU 321 included in the video transmitting apparatus 3 detects a frame starting trigger, the sensor CPU 321 determines a segmenting position for segmenting an image from the image capturing region of the image capturing section 31, and then goes to the processing of step S33. In step S31, the sensor CPU 321 determines the segmenting position, i.e., coordinates of a left upper end of a region of interest ROI, and an image size (lengths in the X-axis direction and the Y-axis direction) thereof, and sets information of the determined coordinates and image size in embedded data. Furthermore, the sensor CPU 321 acquires demosaicing information (color information of the left upper end and information of odd-numbered and even-numbered rows and columns of the left upper end) in the region of interest ROI, includes the acquired demosaicing information in ROI information, and sets the ROI information in the embedded data. The sensor CPU 321 may include, as demosaicing information, information of color arrays and array patterns of the image capturing regions in their entirety illustrated in FIGS. 14A through 17B in the ROI information, and may set the ROI information in the embedded data.

(Step S33)

The sensor CPU 321 sets transmission data including the embedded data in which the coordinates of the left upper end and the image size of the region of interest ROI, and the demosaicing information are set, in the transmitting section 322, after which the sensor CPU 321 brings the demosaicing process to an end.

The transmission data set in step S33 is transmitted from the video transmitting apparatus 3 to the video receiving apparatus 4 by way of communication through hardware (HW) using MIPI.

The receiving section 412 included in the video receiving apparatus 4 extracts the embedded data from the received transmission data and outputs the embedded data to the embedded data acquiring section 414. The embedded data acquiring section 414 decodes the embedded data input from the receiving section 412, acquires various pieces of information (for example, the number of regions of interest ROI, the region numbers and priority of the regions of interest ROI, the data lengths of the regions of interest ROI, the image format of the regions of interest ROI, etc.), and outputs the acquired various pieces of information to the Cam CPU 411.
(Step S41)
The Cam CPU 411, triggered by the timing at which the embedded data are decoded by the embedded data acquiring section 414, acquires coordinates (position and size) of a region of interest ROI whose priority is highest on the basis of the various pieces of information acquired and input by the embedded data acquiring section 414 from the transmission data received by the receiving section 412, and then goes to the processing of step S43. Furthermore, in step S41, the Cam CPU 411 determines the color of the pixel at the left upper end of the region of interest ROI whose priority is highest and which one of combinations of odd-numbered and even-numbered rows and columns the left upper end is represented by.
(Step S43)
The Cam CPU 411 calculates coordinates of the left upper end of the region of interest ROI on the basis of the acquired demosaicing information of the region of interest ROI, and goes to the processing of step S45.
(Step S45)
The Cam CPU 411 sets coordinates of a left upper end of a region of interest ROI to be demosaiced on the basis of the coordinates of the left upper end of the region of interest ROI calculated in step S43. Furthermore, the Cam CPU 411 outputs the set coordinates of the left upper end of the region of interest ROI to be demosaiced and the demosaicing information (information of the coordinates and color array of the region of interest ROI) to the demosaic processing section 421, and goes to the processing of step S47.
The demosaic processing section 421 performs a demosaicing process on the image data input from the Raw processing section 413, using the demosaicing information input from the Cam CPU 411 etc. In this manner, the demosaicing processing is performs on the image data of the region of interest ROI whose priority is highest.
(Step S47)
The Cam CPU 411 determines whether the processing from step S41 to step S45 has been carried out with respect to all regions of interest ROI input from the embedded data acquiring section 414 or not. If the Cam CPU 411 determines that the processing has been carried out with respect to all regions of interest ROI, then the Cam CPU 411 brings the demosaicing process to an end. On the other hand, if the Cam CPU 411 determines that the processing has not been carried out with respect to all regions of interest ROI, then the Cam CPU 411 goes back to the processing of step S41. The Cam CPU 411 repeats the processing from step S41 to step S47 until the demosaicing process has been completed on all regions of interest ROI.

Next, processing timing of the demosaicing process in the transmitting apparatus, the receiving apparatus, and the transmission system according to the present embodiment will be described below with reference to FIG. 21. FIG. 21 is a diagram illustrating an example of a timing chart of the demosaicing process in the transmitting apparatus, the receiving apparatus, and the transmission system according to the present embodiment. "SENSOR V Sync" indicated in FIG. 21 represents a vertical synchronizing signal input to the sensor CPU 321. "SENSOR PROCESSING" indicated in FIG. 21 represents a process performed by the sensor CPU 321. "ISP Sync" indicated in FIG. 21 represents a vertical synchronizing signal input to the Cam CPU 411. "ISP PROCESSING" indicated in FIG. 21 represents a process performed by the Cam CPU 411. Regions of interest ROI-ε1 through ROI-ε3 indicated in FIG. 21 schematically illustrate regions of interest processed in one frame period. In FIG. 21, for an easier understanding, the region of interest ROI-ε1 is processed in the first frame period. For comparison of the sizes of regions of interest, the regions of interest ROI-ε2, ROI-ε3 processed in the second third frame periods are also illustrated. FIG. 21 illustrates time as it elapses from the left toward the right.

Figure 21:
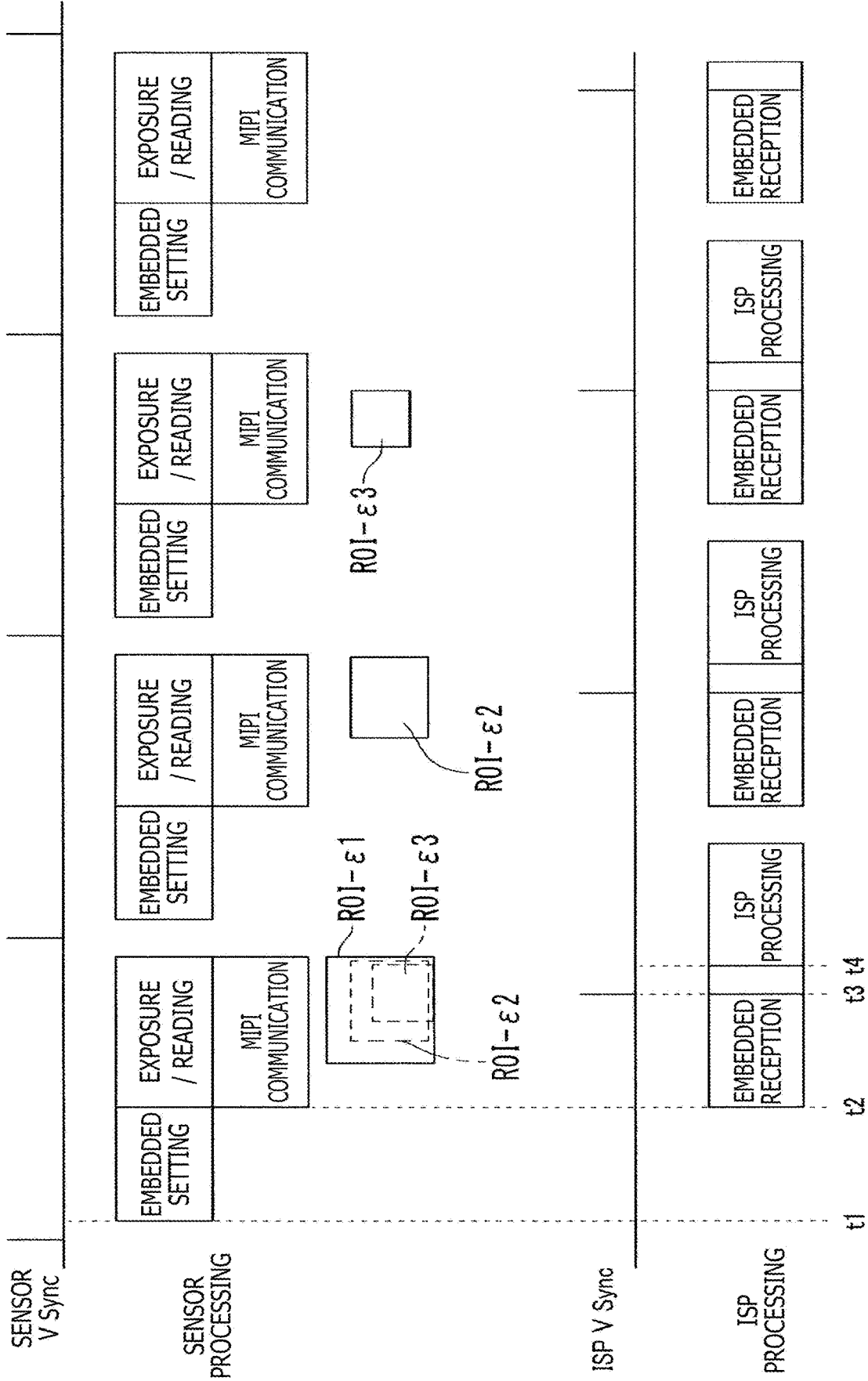
FIG. 21 is a diagram illustrating an example of a timing chart of the demosaicing process in the transmitting apparatus, the receiving apparatus, and the transmission system according to the first embodiment.

As illustrated in FIG. 21, when the sensor CPU 321 detects a frame starting trigger at time t1, the sensor CPU 321 carries out the processing of step S31 described above as an embedded setting process. Specifically, in the embedded setting process, the sensor CPU 321 sets a segmenting position for segmenting an image from the image capturing region of the image capturing section 31 and acquires demosaicing information (color information of the left upper end and information of odd-numbered and even-numbered rows and columns of the left upper end) in the region of interest ROI-ε1.

The sensor CPU 321 transmits transmission data including embedded data having the information set in the embedded setting process to the video receiving apparatus 4 by way of communication through hardware (HW) using MIPI at time t2 when the embedded setting process is finished.

When the sensor CPU 321 has started transmitting the transmission data, the sensor CPU 321 starts exposure and reading in the frame, i.e., the image capturing section 31 starts capturing an image.

At time t3 when the embedded data acquiring section 414 has finished decoding the embedded data included in the transmission data that the Cam CPU 411 has started receiving at time t2, the Cam CPU 411 starts calculating coordinates and size of the region of interest ROI-ε1 and determining a color array thereof. At time t4, the Cam CPU 411 finishes calculating the coordinates and size of the region of interest ROI-ε1 and setting the color array thereof. In other words, the processing from step S41 to step S45 illustrated in FIG. 20 is carried out once during the period from time t3 to time t4.

The video receiving apparatus 4 performs a demosaicing process and image quality adjustment in the ISP processing from time t4.

Although not described in detail, a demosaicing process is performed on the regions of interest ROI-ε2, ROI-ε3 that are different in position and size at the same timing as the region of interest ROI-cl.

As described with reference to FIGS. 20 and 21, the video transmission system 10 can transmit the transmission data having the embedded data including the demosaicing information regarding the regions of interest ROI from the video transmitting apparatus 3 to the video receiving apparatus 4 by way of communication using MIPI. In this manner, the video transmission system 10 can perform a demosaicing process per region of interest ROI.

5. A Modification of the First Embodiment of the Present Disclosure

Figure 22:
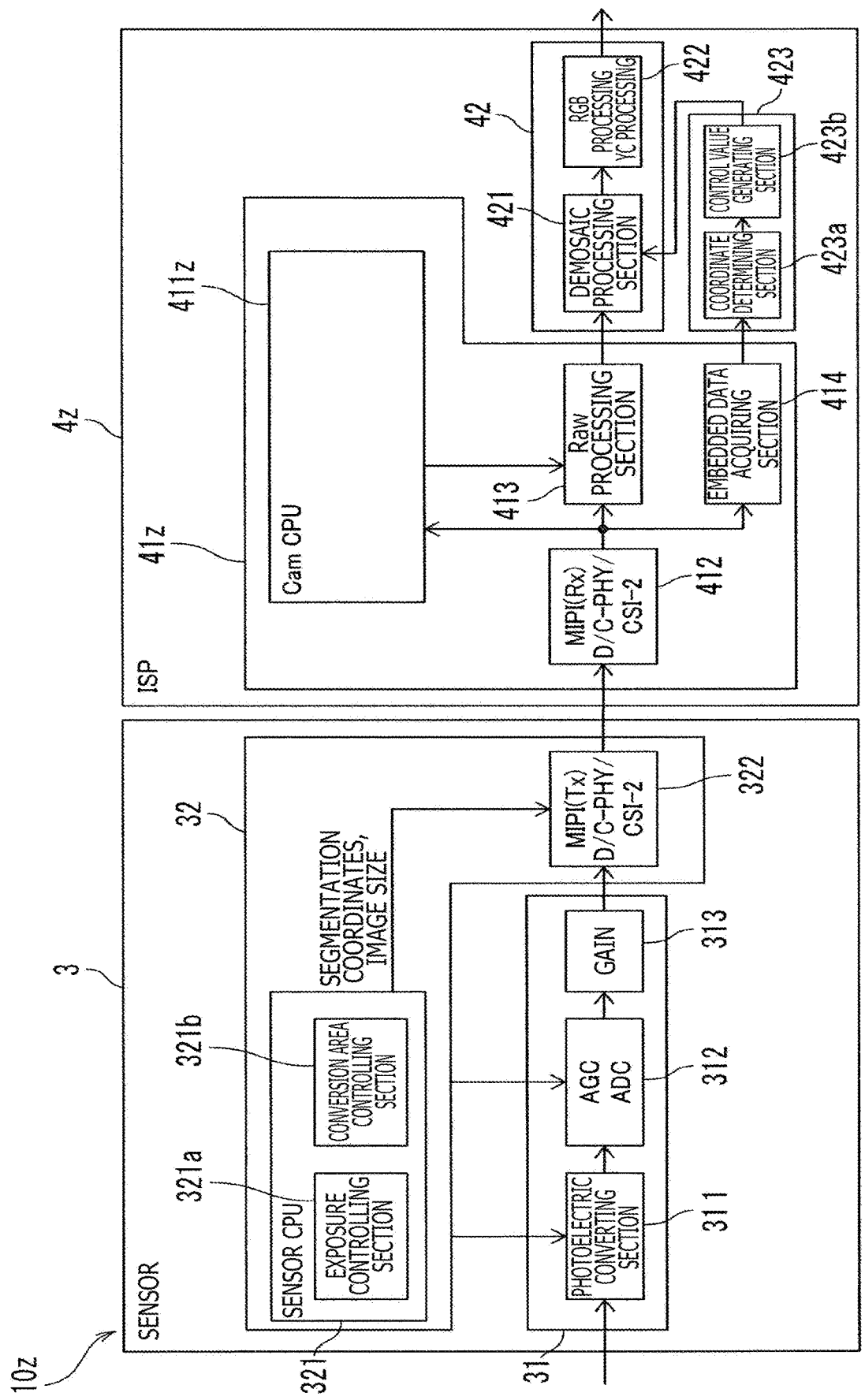
FIG. 22 is a block diagram illustrating a general makeup of a transmitting apparatus, a receiving apparatus, and a transmission system according to a modification of the first embodiment.

Next, a transmitting apparatus, a receiving apparatus, and a transmission system according to a modification of the present embodiment will be described below with reference to FIG. 22. FIG. 22 is a block diagram illustrating a general makeup of a video transmitting apparatus 3, a video receiving apparatus 4z, and a video transmission system 10z according to the present modification. It is noted that those components that are identical in operation and function to those of the video transmitting apparatus 3, the video receiving apparatus 4, and the video transmission system 10 according to the present embodiment are denoted by identical reference characters and will be omitted from description.

As illustrated in FIG. 22, the video transmission system 10z according to the present modification includes the video transmitting apparatus 3 that is identical in configuration to the video transmitting apparatus 3 according to the present embodiment, and the video receiving apparatus 4z that is partly different in configuration from the video receiving apparatus 4 according to the present embodiment. The video receiving apparatus 4z according to the present modification is characterized in that it includes a determining section 423 for determining coordinates of regions of interest ROI and determining color arrays thereof.

As illustrated in FIG. 22, the video receiving apparatus 4z includes the determining section 423 to which various pieces of information output from the embedded data acquiring section 414 are input. On the other hand, a Cam CPU 411z does not have a coordinate determining section. The determining section 423 is hardware-implemented and has a coordinate determining section 423a and a control value generating section 423b.

The coordinate determining section 423a is configured to determine coordinates (positions and sizes) of regions of interest ROI and determining color arrays thereof on the basis of the various pieces of information input from the embedded data acquiring section 414. In a case where information regarding a plurality of regions of interest ROI is input from the embedded data acquiring section 414, the coordinate determining section 411a determines coordinates and a color array per region of interest ROI.

The control value generating section 423b is configured to set coordinates of a left upper end of a region of interest ROI to be demosaiced on the basis of the coordinates of the left upper ends of the regions of interest ROI determined by the coordinate determining section 411a.

The video receiving apparatus 4z according to the present modification is thus identical in operation and function to the video receiving apparatus 4 according to the present embodiment though the determining section for determining coordinates of regions of interest ROI is hardware-implemented. Furthermore, the video transmission system 10z according to the present modification is identical to the video transmission system 10 according to the present embodiment. Therefore, a demosaic processing method according to the present modification will be omitted from description.

As described above, the transmitting apparatus, the receiving apparatus, and the transmission systems according to the present embodiment and modification can perform a demosaicing process on some regions of interest (ROI) segmented by a captured image.

Furthermore, according to the present embodiment and modification, positions, sizes, and numbers of some portions segmented from a captured image are optional. Therefore, the transmitting apparatus, the receiving apparatus, and the transmission systems according to the present embodiment and modification can perform a ROI demosaicing process on pixels as segmented units.

The transmitting apparatus, the receiving apparatus, and the transmission systems according to the present embodiment and modification are configured to transmit the coordinates and sizes of portions segmented from an image capturing region captured by the transmitting apparatus to a sensor CPU at a subsequent stage.

The receiving apparatus according to the present embodiment and modification is configured to receive the coordinates and sizes of portions segmented from the image capturing region of the image capturing section of the transmitting apparatus and use the received coordinates and sizes in controlling the demosaicing process.

The receiving apparatus according to the present embodiment and modification is configured to receive demosaicing information (color array information such as color information of left upper ends) of regions of interest ROI as segmented portions transmitted from the transmitting apparatus and use the received demosaicing information in controlling the demosaicing process.

The receiving apparatus according to the present embodiment and modification can calculate a color of a pixel at the leading position (for example, a left upper end) of a demosaic from the coordinates and sizes of regions of interest ROI and control the designation of a color of the leading pixel (for example, the pixel at a left upper end).

In a case where there are a plurality of regions of interest ROI in one frame (i.e., in one captured image), the transmitting apparatus, the receiving apparatus, and the transmission systems according to the present embodiment and modification can designate a color of the leading pixel (for example, the pixel at a left upper end) of each of the plurality of regions of interest ROI. In this manner, they can perform an appropriate demosaicing process on each of the regions of interest ROI.

6. Second Embodiment of the Present Disclosure

Figure 23:
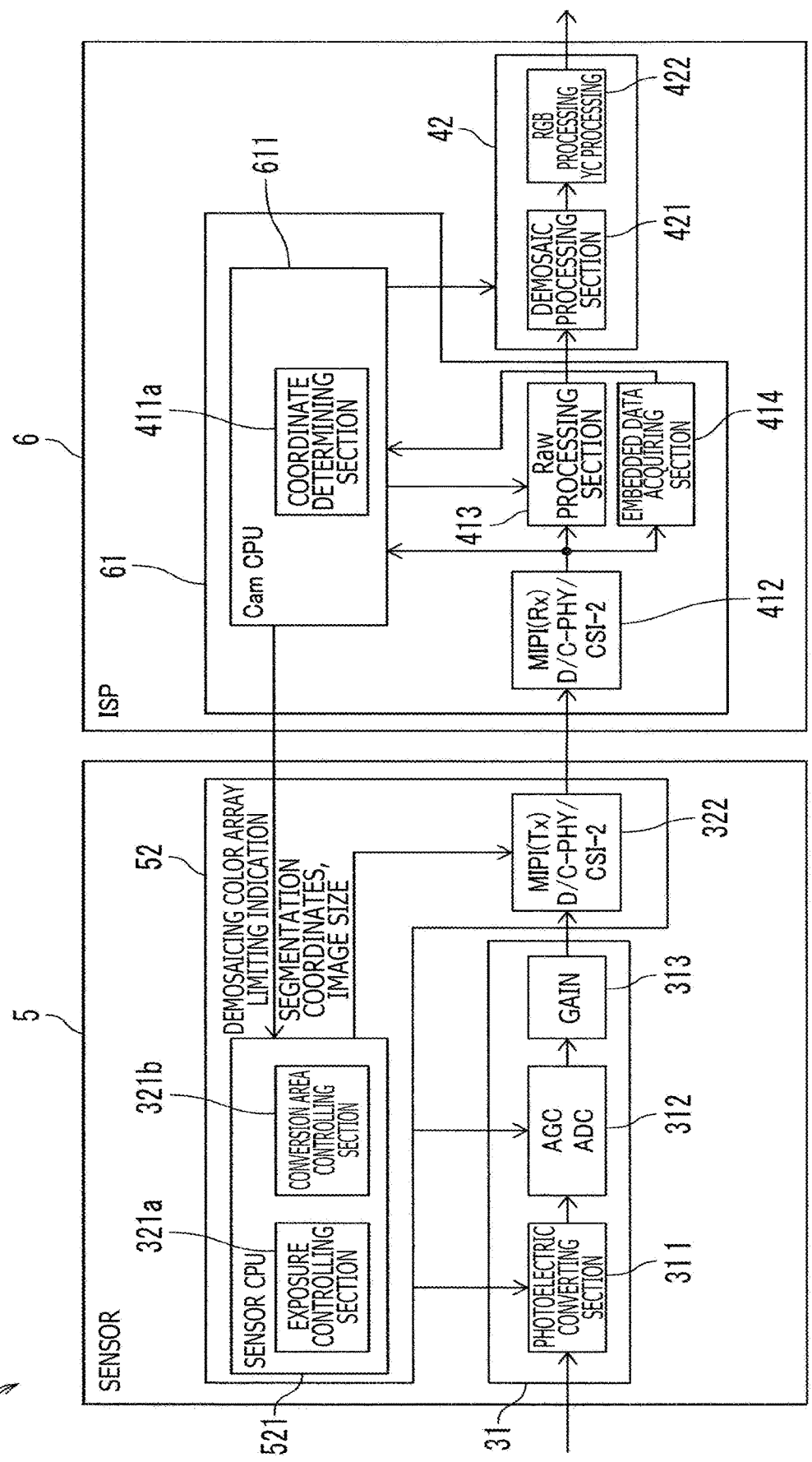
FIG. 23 is a flowchart illustrating a sequence of a demosaicing process in a transmitting apparatus, a receiving apparatus, and a transmission system according to a second embodiment.

Next, a transmitting apparatus, a receiving apparatus, and a transmission system according to a second embodiment of the present disclosure will be described below with reference to FIGS. 23 and 24. First, a general makeup of the transmitting apparatus, the receiving apparatus, and the transmission system according to the present embodiment will be described below with reference to FIG. 23. FIG. 23 is a block diagram illustrating a general makeup of a video transmitting apparatus (an example of the transmitting apparatus) 5, a video receiving apparatus (an example of the receiving apparatus) 6, and a video transmission system (an example of the transmission system) 20 according to the present embodiment. Those components that are identical in operation and function to those of the video transmitting apparatus 3, the video receiving apparatus 4, and the video transmission system 10 according to the first embodiment are denoted by identical reference characters and will be omitted from description.

The video transmitting apparatus 5, the video receiving apparatus 6, and the video transmission system 20 according to the present embodiment are configured to transmit a control signal indicative of a color layout limitation to the video transmitting apparatus 5 in a case where the video receiving apparatus 6 has a limitation on color layouts of a demosaicing process.

As illustrated in FIG. 23, a Cam CPU 611 of the video receiving apparatus 6 is configured to send out a control signal indicative of a demosaic color layout limitation to the video transmitting apparatus 5. Since the video receiving apparatus 6 is of the same configuration and is configured to perform the same function as the video receiving apparatus 4 according to the first embodiment except that the video receiving apparatus 6 can send out the control signal, the video receiving apparatus 6 will be omitted from description.

As illustrated in FIG. 23, the control signal indicative of the color layout limitation sent out from the video receiving apparatus 6 is input to a sensor CPU 521 included in the video transmitting apparatus 5. When the control signal is input to the sensor CPU 521, in a case where the indicated color layout is included in the color arrays of the regions of interest ROI, the sensor CPU 521 does not transmit demosaicing information regarding the limited color layout to the video receiving apparatus 6.

For example, it is assumed that the video receiving apparatus 6 has a limitation such that the demosaicing process cannot be performed in a case where horizontal pixels (pixels in the X-axis directions) of a region of interest ROI are odd-numbered. In this case, for example, the sensor CPU 521 may pose an even-numbered limitation on the coordinates and size of a pixel (for example, a pixel at a left upper end) as a starting point for horizontal pixels and vertical pixels of the region of interest ROI. For example, in a case where there are 151 horizontal pixels in the region of interest ROI, the sensor CPU 521 converts a value (75.5) produced by dividing the 151 pixels by 2 into an integer (75) and multiplies the integer by 2. In this manner, since the number of horizontal pixels in the region of interest ROI becomes even-numbered (150 pixels in this example), the video transmitting apparatus 5 sends out this information as demosaicing information to the video receiving apparatus 6, which can perform the demosaicing process on the region of interest ROI.

Since the video transmitting apparatus 5 is of the same configuration and is configured to perform the same function as the video transmitting apparatus 3 according to the first embodiment except that the video transmitting apparatus 5 can receive the control signal indicative of the demosaic color layout limitation sent out from the video receiving apparatus 6 and perform the above process based on the control signal, the video transmitting apparatus 5 will be omitted from description.

(Demosaic Processing Method)

Next, a demosaic processing method in the transmitting apparatus, the receiving apparatus, and the transmission system according to the present embodiment will be described below using FIG. 24 with reference to FIG. 23. FIG. 24 is a flowchart illustrating a sequence of a demosaicing process in the transmitting apparatus, the receiving apparatus, and the transmission system according to the present embodiment.

When the video transmission system 20 according to the present embodiment is switched on to start operating the video transmitting apparatus 5 and the video receiving apparatus 6, the video transmitting apparatus 5 starts a sensor initializing process and the video receiving apparatus 6 starts an IPS initializing process.

(Step S60)

Figure 24:
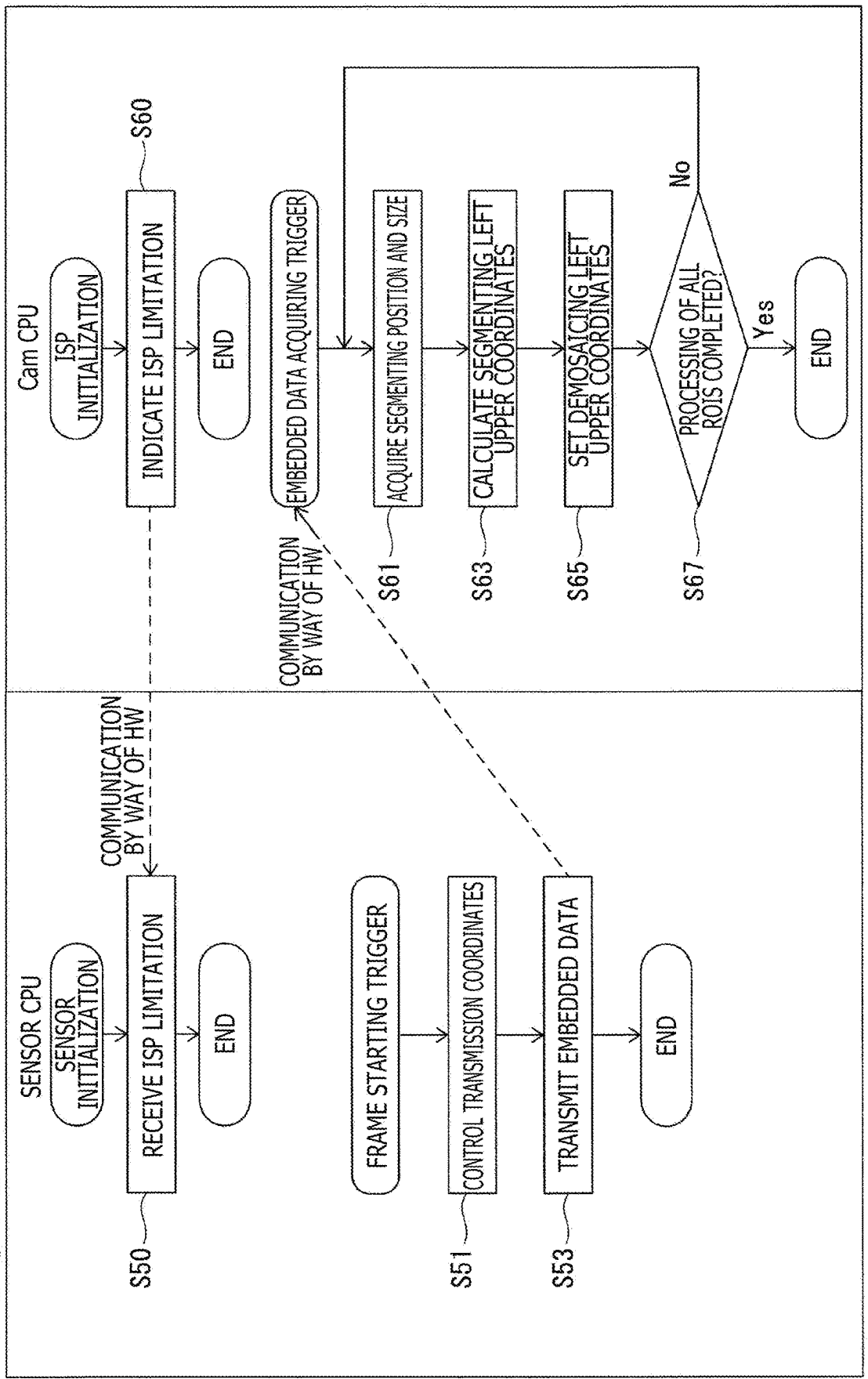
FIG. 24 is a diagram illustrating an example of a timing chart of the demosaicing process in the transmitting apparatus, the receiving apparatus, and the transmission system according to the second embodiment.

As illustrated in FIG. 24, when the Cam CPU 611 in the video receiving apparatus 6 starts the IPS initializing process, the Cam CPU 611 sends out an IPS limitation indicating signal indicative of a limitation on the color layouts of the demosaicing process to the video transmitting apparatus 5 by way of hardware (HW) using MIPI, for example, and finishes the IPS initializing process.

(Step S50)

As illustrated in FIG. 24, the sensor CPU 521 in the video transmitting apparatus 5 starts the sensor initializing process. If the sensor CPU 321 determines that it receives the IPS limitation indicating signal in step S50, then the sensor CPU 321 receives information regarding the limitation included in the IPS limitation indicating signal, stores the received information in a storage section, and finishes the sensor initializing process. On the other hand, if the sensor CPU 321 determines that it does not receive the IPS limitation indicating signal in step S50, then the sensor CPU 321 finishes the sensor initializing process without performing any special process.

(Step S51)

As illustrated in FIG. 24, when the sensor CPU 521 detects a frame starting trigger, the sensor CPU 521 first performs a transmission coordinate controlling process. In a case where the sensor CPU 521 stores information regarding a limitation on the color layouts of the demosaicing process, the sensor CPU 521 performs a predetermined process on the coordinates of the left upper end and image size of the region of interest ROI or the color array thereof in order that the demoisaicing process sent out to the video receiving apparatus 6 will not violate the limitation, and then goes to the processing of step S53. On the other hand, in a case where the sensor CPU 521 does not store information regarding a limitation on the color layouts of the demosaicing process, the sensor CPU 521 performs the same process as step S31 according to the first embodiment, and then goes to the processing of step S53.

(Step S53)

The sensor Cam CPU 521 performs an embedded data transmitting process and finishes the demosaicing process. The processing of step S53 is the same as the processing of step S33 according to the first embodiment and will be omitted from description.

(Step S61 Through Step S67)

The Cam CPU 411, triggered by the timing at which the embedded data are decoded by the embedded data acquiring section 414, starts the processing of step S61. The processing of step S61 is the same as the processing of step S41 according to the first embodiment, the processing of step S63 is the same as the processing of step S43 according to the first embodiment, the processing of step S65 is the same as the processing of step S45 according to the first embodiment, and the processing of step S67 is the same as the processing of step S47 according to the first embodiment. Therefore, step S61 through step S67 will be omitted from description.

The video receiving apparatus 6 has a predetermined limitation on the color layouts of the demosaicing process. However, the sensor CPU 521 sets demosaicing information in order that the limitation will not be violated. Consequently, the Cam CPU 611 can perform the demosaicing process without determining whether the demosaicing information violates the limitation or not, attempting to restrain the processing burden of the demosaicing process.

As described above, though a transmitting process, a receiving process, and the transmission system according to the present embodiment have predetermined restrictions compared with the first embodiment, they can realize a demosaicing process for demosaicing some regions of interest (ROI) segmented from the captured image.

The present disclosure is not limited to the above embodiments, but can be modified in various ways.

The video transmitting apparatuses 3 and 5 according to the first and second embodiments set a minimum rectangular shape including an object to be segmented as a region of interest ROI even if the object is not of a rectangular shape. Furthermore, the video transmitting apparatuses 3 and 5 include the positional information (the left upper end, the length in the X-axis direction, the length in the Y-axis direction) of the region of interest ROI, and the demosaicing information (the color information of the left upper end etc.)

of the region of interest ROI in the embedded data. However, the present disclosure is not limited to such details.

For example, the video transmitting apparatuses 3 and 5 may include the positional information and demosaicing information of a target object in the payload and send out the payload to the video receiving apparatuses 4 and 6, as with the presupposed technology 2. In this case, since the target object is not of a rectangular shape, image data may not exist in the periphery of pixels to be demosaiced. However, the demosaicing process can be performed in such a case by interpolating the image data in the same manner as with the boundary process, for example.

The conversion area controlling section 321*b*, the sensor CPU 321, or the controlling section 32 in the video transmitting apparatuses 3 and 5 according to the first and second embodiments may be configured to control the area of the image data of regions of interest ROI such that the demosaicing information will satisfy predetermined conditions. Specifically, the conversion area controlling section 321*b*, the sensor CPU 321, or the controlling section 32 may control the image data of the regions of interest ROI such that the demosaicing information will satisfy either one of the array patterns PA1 through PA4, PB1 through PB4, PC1 through PC4, PD1 through PD4 (an example of the predetermined conditions) depending on the array examples A through D, for example, among the color arrays of the image capturing elements. In this manner, the transmitting apparatus may control regions of interest to achieve a certain pattern for demosaicing.

The present disclosure has been described above with respect to the presupposed technologies, the embodiments, and the modification. However, the present disclosure is not limited to the above embodiments etc., but various changes and modifications may be made therein. It is noted that the advantages set forth in the present description are given by way of illustrative example only. The advantages of the present disclosure are not limited to those set forth in the present description. The present disclosure may have other advantages than the advantages set forth in the present description.

Furthermore, the present disclosure may have the following arrangements, for example:

(1)
A transmitting apparatus including:
a controlling section that controls acquisition of demosaicing information for use in a demosaicing process for demosaicing image data of a ROI (Region Of Interest); and
a transmitting section that sends out the image data of the ROI as payload data and sends out ROI information as embedded data.

(2)
The transmitting apparatus according to (1), in which the demosaicing information is included in the ROI information and sent out from the transmitting section.

(3)
The transmitting apparatus according to (1), in which the controlling section acquires a color array of the image data of the ROI or color information of an end of the image data of the ROI as the demosaicing information.

(4)
The transmitting apparatus according to (1), in which the controlling section controls an area of the image data of the ROI such that the demosaicing information satisfies a predetermined condition.

(5)
The transmitting apparatus according to (4), in which the controlling section acquires the color information of the end and information indicating which one of combinations of an odd-numbered row and an even-numbered row and an odd-numbered column and an even-numbered column the end represents, as the demosaicing information.

(6)
The transmitting apparatus according to (1), in which the transmitting section sends out a signal according to MIPI (Mobile Industry Processor Interface) D-PHY standards, MIPI C-PHY standards, or MIPI CSI (Camera Serial Interface)-2 standards.

(7)
A receiving apparatus including:
a receiving section that receives a transmission signal including image data of a ROI (Region Of Interest) in payload data and including ROI information in embedded data;
a controlling section that controls extraction of demosaicing information for use in a demosaicing process for demosaicing the image data of the ROI from the transmission signal received by the receiving section; and
a processing section that performs the demosaicing process for demosaicing the image data of the ROI using the demosaicing information extracted by the controlling section.

(8)
The receiving apparatus according to (7), in which the controlling section extracts the demosaicing information from the ROI information included in the transmission signal.

(9)
The receiving apparatus according to (7), in which the controlling section extracts a color array of the image data of the ROI or color information of an end of the image data of the ROI as the demosaicing information.

(10)
The receiving apparatus according to (9), in which the controlling section extracts the color information of the end of the ROI and information indicating which one of combinations of an odd-numbered row and an even-numbered row and an odd-numbered column and an even-numbered column the end represents, as the demosaicing information.

(11)
The receiving apparatus according to (7), in which the processing section performs a boundary process on image data disposed at a peripheral end in the ROI.

(12)
The receiving apparatus according to (7), in which the receiving section receives a signal according to MIPI (Mobile Industry Processor Interface) D-PHY standards, MIPI C-PHY standards, or MIPI CSI (Camera Serial Interface)-2 standards.

(13)
A transmission system including:
a transmitting apparatus having a controlling section that acquires demosaicing information for use in a demosaicing process for demosaicing image data of a ROI (Region Of Interest) and a transmitting section that sends out the image data as payload data and sends out ROI information as embedded data; and
a receiving apparatus having a receiving section that receives a transmission signal including the image data of the ROI in the payload data and including the ROI information in the embedded data, a controlling section that controls extraction of demosaicing information for use in a demosaicing process for demosaicing the image data of the ROI from the transmission signal received by the receiving section, and a processing section that performs the demosaicing process for demosaicing the image data of the ROI using the demosaicing information extracted by the controlling section.

(14)

The transmission system according to (13), in which
the transmitting apparatus sends out the demosaicing information included in the ROI information from the transmitting section, and
the receiving apparatus receives the transmission signal having the demosaicing information with the receiving section and extracts the demosaicing information from the ROI information included in the transmission signal received by the receiving section with the controlling section.

(15)

The transmission system according to (13), in which
the transmitting apparatus sends out a color array of the image data of the ROI or color information of an end of the image data of the ROI as the demosaicing information from the transmitting section, and
the receiving apparatus receives the color array or the color information of the end of the image data of the ROI as the demosaicing information with the receiving section.

(16)

The transmission system according to (15), in which
the transmitting apparatus sends out the color information of the end of the ROI and information indicating which one of combinations of an odd-numbered row and an even-numbered row and an odd-numbered column and an even-numbered column the end represents, as the demosaicing information from the transmitting section, and
the receiving apparatus receives the color information and the information indicating which one of combinations of an odd-numbered row and an even-numbered row and an odd-numbered column and an even-numbered column the end represents, as the demosaicing information with the receiving section.

(17)

The transmission system according to (13), in which
the transmitting apparatus sends out a signal according to MIPI (Mobile Industry Processor Interface) D-PHY standards, MIPI C-PHY standards, or MIPI CSI (Camera Serial Interface)-2 standards from the transmitting section, and
the receiving apparatus receives a signal according to the MIPI D-PHY standards, the MIPI C-PHY standards, or the MIPI CSI-2 standards with the receiving section.

It will be understood that those skilled in the art can anticipate various corrections, combinations, sub-combinations, and changes depending on design requirements and other factors as falling within the scope of attached claims and the scope of their equivalents.

REFERENCE SIGNS LIST 1, 10, 10z, 20: Video transmission system
3, 5, 100: Video transmitting apparatus
4, 4z, 6, 200: Video receiving apparatus
31, 110: Image capturing section
32, 41: Controlling section
42: Image processing section
100A: CSI transmitter
100B: CCI slave
111: Captured image
112, 112a1, 112a2, 112a3, 112a4, 112b1, 112b4, 123a4, 223A: ROI image
112b: Compressed image data
113, 114: Positional information
115: Priority
116, 116a1, 116a2: Transmission image
118: Image
120, 130: Image processing section
120A, 120A1, 120A2, 130A, 147B: Compressed image data
120B: ROI information
120C: Frame information
121: ROI segmenting section
122: ROI analyzing section
123: Detecting section
124: Priority setting section
125, 131: Encoding section
126: Image processing controlling section
140: Transmitting section
141: LINK controlling section
142: ECC generating section
143: PH generating section
144, 145: ROI data buffer
144: EBD buffer
146: Normal image data buffer
147: Combining section
147A: Transmission data
200A: CSI receiver
200B: CCI master
210: Receiving section
211: Header separating section
212: Header interpreting section
213: Payload separating section
214: EBD interpreting section
214A: EBD data
215: ROI data separating section
215A, 215B: Payload data
220: Information processing section
221: Information extracting section
221A: Extracted information
222: ROI decoding section
222A: Image data
223: ROI image generating section
224: Normal image decoding section
224A: Normal image
311: Photoelectric converting section
312: Signal converting section
313: Amplifying section
321, 521: Sensor CPU
321a: Exposure controlling section
321b: Conversion area controlling section
322: Transmitting section
411, 411z, 611: Cam CPU
411a: Coordinate determining section
412: Receiving section
413: Raw processing section
414: Embedded data acquiring section
421: Demosaic processing section
422: Image quality adjusting section
423: Determining section
423a: Coordinate determining section
423b: Control value generating section
521: Sensor CPU A, B, C: Array example
ADC: Analog-to-digital conversion
AGC: Signal amplification
Cb: Color difference component
CCI: Camera control interface
CL: Clock lane

The invention claimed is:

1. A transmitting apparatus comprising:
at least one electronic processor that controls acquisition of demosaicing information for use in a demosaicing process for demosaicing image data of a ROI (Region Of Interest); and
a transmitter that transmits the image data of the ROI as payload data and transmits ROI information as embedded data,
wherein the at least one electronic processor controls an area of the image data of the ROI such that the demosaicing information satisfies a predetermined condition,
and the at least one electronic processor acquires the color information of the end and information indicating which one of combinations of an odd-numbered row and an even-numbered row and an odd-numbered column and an even-numbered column the end represents, as the demosaicing information.

2. The transmitting apparatus according to claim 1, wherein
the demosaicing information is included in the ROI information and sent out from the transmitter.

3. The transmitting apparatus according to claim 1, wherein
the at least one electronic processor acquires the color array of the image data of the ROI or color information of an end of the image data of the ROI as the demosaicing information.

4. The transmitting apparatus according to claim 1, wherein
the transmitter sends out a signal according to MIPI (Mobile Industry Processor Interface) D-PHY standards, MIPI C-PHY standards, or MIPI CSI (Camera Serial Interface)-2 standards.

5. A receiving apparatus comprising:
a receiver that receives a transmission signal including image data of a ROI (Region Of Interest) in payload data and including ROI information in embedded data;
at least one electronic processor that controls extraction of demosaicing information for use in a demosaicing process for demosaicing the image data of the ROI from the transmission signal received by the receiver and
performs the demosaicing process for demosaicing the image data of the ROI using the demosaicing information extracted by the at least one electronic processor,
wherein the at least one electronic processor extracts a color array of the image data of the ROI or color information of an end of the image data of the ROI as the demosaicing information,
and the at least one electronic processor extracts the color information of the end of the ROI and information indicating which one of combinations of an odd-numbered row and an even-numbered row and an odd-numbered column and an even-numbered column the end represents, as the demosaicing information.

6. The receiving apparatus according to claim 5, wherein
at least one electronic processor extracts the demosaicing information from the ROI information included in the transmission signal.

7. The receiving apparatus according to claim 5, wherein
the at least one electronic processor performs a boundary process on image data disposed at a peripheral end in the ROI.

8. The receiving apparatus according to claim 5, wherein
the receiver receives a signal according to MIPI (Mobile Industry Processor Interface) D-PHY standards, MIPI C-PHY standards, or MIPI CSI (Camera Serial Interface)-2 standards.

9. A transmission system comprising:
a transmitter that acquires demosaicing information for use in a demosaicing process for demosaicing image data of a ROI (Region Of Interest) and sends out the image data as payload data and sends out ROI information as embedded data;
a receiver that receives a transmission signal including the image data of the ROI in the payload data and including the ROI information in the embedded data; and
a at least one electronic processor that controls extraction of demosaicing information for use in a demosaicing process for demosaicing the image data of the ROI from the transmission signal received by the receiver and performs the demosaicing process for demosaicing the image data of the ROI using the demosaicing information extracted by the at least one electronic processor,
wherein the transmitter sends out a color array of the image data of the ROI or color information of an end of the image data of the ROI as the demosaicing information,
the receiver receives the color array or the color information of the end of the image data of the ROI as the demosaicing information,
the transmitter sends out the color information of the end of the ROI and information indicating which one of combinations of an odd-numbered row and an even-numbered row and an odd-numbered column and an even-numbered column the end represents, as the demosaicing information, and
the receiver receives the color information and the information indicating which one of combinations of an odd-numbered row and an even-numbered row and an odd-numbered column and an even-numbered column the end represents, as the demosaicing information.

10. The transmission system according to claim 9, wherein
the transmitter sends out the demosaicing information included in the ROI information, and
the receiver receives the transmission signal having the demosaicing information and extracts the demosaicing information from the ROI information included in the transmission signal with the at least one electronic processor.

11. The transmission system according to claim 9, wherein
the transmitter sends out a signal according to MIPI (Mobile Industry Processor Interface) D-PHY standards, MIPI C-PHY standards, or MIPI CSI (Camera Serial Interface)-2 standards from the transmitting section, and
the receiver receives a signal according to the MIPI D-PHY standards, the MIPI C-PHY standards, or the MIPI CSI-2 standards.

* * * * *